United States Patent
Abdo et al.

(10) Patent No.: US 11,151,434 B2
(45) Date of Patent: Oct. 19, 2021

(54) TWO DIMENSIONAL BARCODE PROVIDED WITH SURROUNDING DYNAMIC ENVIRONMENTAL INDICATOR AND COLOR CALIBRATION REFERENCE

(71) Applicant: Temptime Corporation, Morris Plains, NJ (US)

(72) Inventors: Mohannad Abdo, Clifton, NJ (US); Marielle K. Smith, Parlin, NJ (US); Eric W. Liberato, Pequannock, NJ (US)

(73) Assignee: TEMPTIME CORPORATION, Morris Plains, NJ (US)

( * ) Notice: Subject to any disclaimer, the term of this patent is extended or adjusted under 35 U.S.C. 154(b) by 99 days.

(21) Appl. No.: 16/526,527

(22) Filed: Jul. 30, 2019

(65) Prior Publication Data

US 2021/0034933 A1 Feb. 4, 2021

(51) Int. Cl.
*G06K 7/14* (2006.01)
*G06K 19/06* (2006.01)

(52) U.S. Cl.
CPC .... *G06K 19/0614* (2013.01); *G06K 19/06112* (2013.01)

(58) Field of Classification Search
CPC .. G06K 7/1473; G06K 7/1417; G06K 7/1434; G06K 19/06037; G06K 19/06075
USPC ........................................ 235/462.01, 462.09
See application file for complete search history.

(56) References Cited

U.S. PATENT DOCUMENTS

| | | | |
|---|---|---|---|
| 2015/0118362 A1* | 4/2015 | Raczynski | A47J 36/00 426/87 |
| 2016/0292486 A1* | 10/2016 | Prusik | G06K 19/06046 |
| 2019/0210806 A1* | 7/2019 | Aida | G06Q 10/08 |
| 2019/0267045 A1* | 8/2019 | Rueger | G11B 33/10 |
| 2019/0316975 A1* | 10/2019 | Tada | G01K 11/16 |
| 2020/0005237 A1* | 1/2020 | Simons | G06K 19/06037 |
| 2020/0158579 A1* | 5/2020 | Tokuda | B41M 5/28 |

FOREIGN PATENT DOCUMENTS

WO WO-2019206130 A1 * 10/2019 ......... G06Q 10/0832

* cited by examiner

*Primary Examiner* — Paultep Savusdiphol
(74) *Attorney, Agent, or Firm* — K&L Gates LLP

(57) ABSTRACT

An indicator includes a substrate, a two-dimensional barcode symbol provided on the substrate, a space on the substrate surrounding the barcode symbol, and a historical environmental condition indicator on the substrate. The two-dimensional barcode symbol may be printed on the substrate, preferably in a rectangular, and more preferably in a square configuration. The two-dimensional barcode is printed preferably in black and white and more preferably according to a certain standard. The space on the substrate surrounding the barcode symbol has four quadrants. Additionally, the historical environmental condition indicator is preferably a historical temperature indicator, which occupies space on the substrate in at least two of the four quadrants. The historical environmental condition indicator preferably occupies three and more preferably occupies four of the four quadrants.

30 Claims, 10 Drawing Sheets

Table 1. Summary Data – R Values for 2D Barcodes at Different Configurations

| 2D Barcode Sample Images | | | | |
|---|---|---|---|---|
| | Square A | | Solid Line | |
| Image Capture Angle | Flat Surface | Curved Surface | Flat Surface | Curved Surface |
| Front Facing (Control) | 86 | 103 | 77 | 124 |
| Top Side | 85 | 114 | 80 | 122 |
| Right Side | 81 | 99 | 61 | 83 |
| Left Side | 78 | N/A¹ | 63 | N/A¹ |
| Bottom Side | 88 | 107 | 108 | 112 |
| Standard Deviation | 4 | 6 | 19 | 19 |

```
                              143  000  111  . . .
                              254  019  156  . . .
              Blue intensity values
                              004  241  177  . . .
                              065  013  011  . . .

251  191  013  . . .
                    129  141  111  . . .
      Green intensity values
                    000  130  079  . . .
                    178  055  201  . . .

082  155  255  . . .
          111  205  021  . . .
Red intensity values
          017  019  214  . . .
          091  088  163  . . .
```

FIG. 6A

TWO DIMENSIONAL BARCODE PROVIDED WITH SURROUNDING DYNAMIC ENVIRONMENTAL INDICATOR AND COLOR CALIBRATION REFERENCE

BACKGROUND

A barcode is an optical machine-readable representation of data. A two-dimensional (2D) barcode (e.g., Data Matrix or QR Code), is a two-dimensional way to represent information in a bar code. Black and white 2D barcodes can represent more data per unit area than one-dimensional (i.e., linear) barcodes (e.g., Code 39 or Code 128). Data recovery from barcodes may be system critical and many 2D barcode technologies provide robust error correction capabilities. Typically, using multiple linked barcodes or larger sized barcodes may increase data recovery capabilities. However, space available for barcodes may be limited in many aspects. Moreover, the current barcode technology may be improved upon as presently disclosed.

SUMMARY

The present disclosure provides a new and innovative system, methods and apparatus for providing and reading 2D barcodes that are associated with a dynamic environmental indicator(s) and a color calibration reference(s) that closely surround the barcode (e.g., the dynamic environmental indicator is not underprinted or overprinted by static ink of the barcode modules). The environmental indicator may change color state (either continuously or step-wise) in response to environmental conditions, or may change color almost immediately from one state to another, e.g., dark to light or vice versa. In light of the disclosure herein and without limiting the disclosure in any way, in an aspect of the present disclosure, which may be combined with any other aspect listed herein unless specified otherwise, an indicator includes a substrate, a two-dimensional barcode symbol provided on the substrate, a space on the substrate surrounding the barcode symbol, and a historical environmental condition indicator on the substrate. The two-dimensional barcode symbol may be printed on the substrate, preferably in a rectangular, and more preferably in a square configuration. The two-dimensional barcode is printed preferably in black and white and more preferably according to a certain standard. The space on the substrate surrounding the barcode symbol has four quadrants. Additionally, the historical environmental condition indicator is preferably a historical temperature indicator, which occupies space on the substrate in at least two of the four quadrants. The historical environmental condition indicator preferably occupies three and more preferably occupies four of the four quadrants.

In another aspect of the present disclosure, which may be combined with any other aspect listed herein unless specified otherwise, the barcode symbol is a square with four side boundaries, and each quadrant corresponds to one side boundary of the two-dimensional barcode symbol.

In another aspect of the present disclosure, which may be combined with any other aspect listed herein unless specified otherwise, the historical environmental condition indicator is a hollow rectangle, preferably a square, surrounding the two-dimensional barcode symbol.

In another aspect of the present disclosure, which may be combined with any other aspect listed herein unless specified otherwise, the indicator further includes a reference region surrounding the bar code in the same quadrants as the historical environmental condition indicator.

In another aspect of the present disclosure, which may be combined with any other aspect listed herein unless specified otherwise, the indicator further includes a second historical environmental condition indicator located between the first environmental condition indicator and the two-dimensional barcode symbol.

In another aspect of the present disclosure, which may be combined with any other aspect listed herein unless specified otherwise, the historical environmental condition indicator has a chemistry that is configured, responsive to the occurrence of an environmental condition, to undergo a chemical or physical state change between an initial state and an end state, causing a change in the color state of the historical environmental condition indicator. Additionally, the color state indicates exposure to the environmental condition.

In another aspect of the present disclosure, which may be combined with any other aspect listed herein unless specified otherwise, the barcode symbol is valid when the historical environmental condition indicator is in the initial state.

In another aspect of the present disclosure, which may be combined with any other aspect listed herein unless specified otherwise, the barcode symbol is valid when the historical environmental condition indicator is in an intermediate state between the initial state and the end state.

In another aspect of the present disclosure, which may be combined with any other aspect listed herein unless specified otherwise, the two-dimensional error-correcting barcode symbol is valid when the historical environmental condition indicator is in the end state.

In another aspect of the present disclosure, which may be combined with any other aspect listed herein unless specified otherwise, the environmental condition is selected from the group consisting of time, temperature, and time-temperature product.

In another aspect of the present disclosure, which may be combined with any other aspect listed herein unless specified otherwise, the historical environmental condition indicator undergoes a continuous chemical or physical state change.

In another aspect of the present disclosure, which may be combined with any other aspect listed herein unless specified otherwise, the historical environmental condition indicator continuously changes color state between the initial state and the end state when exposed to the environmental condition.

In another aspect of the present disclosure, which may be combined with any other aspect listed herein unless specified otherwise, the two-dimensional barcode symbol is from the symbology group consisting of Data Matrix, QR Code, Aztec Code, MaxiCode, PDF417 and Dot Code symbologies.

In another aspect of the present disclosure, which may be combined with any other aspect listed herein unless specified otherwise, the historical environmental condition indicator is initially in a first color state when unactivated and dynamically changes to a plurality of different color states within a range between the initial state and the end state before reaching the end state.

In another aspect of the present disclosure, which may be combined with any other aspect listed herein unless specified otherwise, the historical environmental condition indicator reaches an intermediate state between the initial state and the end state when the specified condition of the sensed property is beyond a threshold value. Additionally, the threshold value is preferably a labeled product life.

In another aspect of the present disclosure, which may be combined with any other aspect listed herein unless specified otherwise, the historical environmental condition indicator dynamically changes to a plurality of different color states related to one of expended product life and remaining labeled product life.

In another aspect of the present disclosure, which may be combined with any other aspect listed herein unless specified otherwise, the barcode symbol includes encoded data identifiers (e.g., Application Identifiers, such as GS1 Application Identifiers). Preferably, a first data identifier indicates the size and location of the historical environmental condition indicator and a second data identifier indicates product life equation parameters. Additionally, the product life equation parameters may preferably be Arrhenius equation parameters.

In another aspect of the present disclosure, which may be combined with any other aspect listed herein unless specified otherwise, the first data identifier and the second data identifier are the same data identifier.

In another aspect of the present disclosure, which may be combined with any other aspect listed herein unless specified otherwise, an indicator includes a substrate, a two-dimensional barcode symbol provided on the substrate, a space on the substrate surrounding the barcode symbol and spaced from the barcode symbol by a gap, and a plurality of historical environmental condition indicators. The two-dimensional barcode symbol is preferably printed on the substrate, preferably in a rectangular, and more preferably in a square configuration. Additionally, the two-dimensional barcode is preferably black and white, more preferably provided according to a certain standard. Additionally, the gap has a width. The plurality of historical environmental condition indicators are preferably historical temperature indicators, which occupy at least a portion of the space on the substrate.

In another aspect of the present disclosure, the indicator includes a reference region that surrounds the barcode.

In another aspect of the present disclosure, the indicator includes a plurality of reference regions surrounding the barcode in the same quadrants as the plurality of historical environmental condition indicators.

In another aspect of the present disclosure, which may be combined with any other aspect listed herein unless specified otherwise, an article of manufacture includes a pharmaceutical, biological, or food product, a container holding the product, and an indicator provided on or in the container. Additionally the indicator is preferably applied to the outside surface of the container.

In another aspect of the present disclosure, which may be combined with any other aspect listed herein unless specified otherwise, a method of reading an indicator includes optically scanning an image of the indicator to obtain color values for pixels in the image. The indicator includes a barcode symbol provided on a substrate and at least one dynamic indicator. Additionally, the at least one dynamic indicator is provided in a space on the substrate surrounding the barcode symbol. The method also includes constructing a scanned pixel map containing the color values in the barcode symbol and the at least one dynamic indicator, processing the pixels in the scanned pixel map to assign a binary color value to each pixel and to form a binarised pixel map, identifying the two-dimensional barcode symbol in the binarised pixel map, and decoding the identified two-dimensional barcode symbol in the binarised pixel map to recover a symbol codeword sequence. The method also includes recovering underlying data codewords from the symbol codeword sequence, preferably by utilizing error correction process on the symbol codeword sequence, and processing the data codewords for identification of the at least one dynamic indicator. Additionally, the method includes determining an average color value of the at least one dynamic indicator, and processing the average color value of the at least one dynamic indicator to determine a reflectance percentage of incident light at a time of scanning.

In another aspect of the present disclosure, which may be combined with any other aspect listed herein unless specified otherwise, processing color information includes capturing white light reflectance of pixels included in the at least one dynamic indicator and creating a colored light filter effect on reflectance data from the scanned pixels utilizing a filter to generate filtered colored image values of the pixels in a scanned pixel map.

In another aspect of the present disclosure, which may be combined with any other aspect listed herein unless specified otherwise, processing color information further includes reducing the filtered colored image values in the scanned pixel map to greyscale values, determining an average greyscale value of the average color value of the barcode modules, and processing the average grey value to determine the incident light reflectance percentage at the time of scanning.

In another aspect of the present disclosure, which may be combined with any other aspect listed herein unless specified otherwise, processing the pixels in the scanned pixel map includes classifying each pixel as one of a black pixel, a white pixel, and a color pixel.

In another aspect of the present disclosure, which may be combined with any other aspect listed herein unless specified otherwise, the black pixels, the white pixels, and the color pixels are used to form a ternarised pixel map, and the black and white pixels in the ternarised pixel map are used to identify the two-dimensional barcode symbol in the ternarised pixel map.

In another aspect of the present disclosure, which may be combined with any other aspect listed herein unless specified otherwise, the at least one dynamic indicator includes a plurality of dynamic indicators. Additionally, determining an average color value of the at least one dynamic indicator includes determining an average color value of a subset of the plurality of dynamic indicators.

In another aspect of the present disclosure, which may be combined with any other aspect listed herein unless specified otherwise, the subset is selected based on (i) orientation of the barcode symbol in relation to a reader, (ii) position of a respective dynamic indicator of the plurality of dynamic indicators in relation to the barcode symbol and the reader, (iii) distance between a respective dynamic indicator of the plurality of dynamic indicators and the reader, and/or (iv) distance of a respective dynamic indicator to an outside edge of the barcode symbol.

In another aspect of the present disclosure, which may be combined with any other aspect listed herein unless specified otherwise, a reading apparatus includes a light source configured to illuminate an indicator including a two-dimensional barcode symbol and at least one dynamic indicator, preferably a historical temperature indicator. The reading apparatus further includes an image sensor configured to capture image data from light reflected from the indicator and a processor including a barcode module and a dynamic indicator module. The barcode module is configured to decode representations of the two-dimensional barcode in the image data captured by the image sensor. Additionally, the dynamic indicator module is configured to process the pixels of the image data corresponding to the at least one dynamic indicator, assign a binary color value to each pixel, determine an average color value of the at least one dynamic indicator, and process the average color value of the at least one dynamic indicator to determine a reflectance percentage of incident light at a time of scanning.

In another aspect of the present disclosure, which may be combined with any other aspect listed herein unless specified otherwise, the at least one dynamic indicator includes a plurality of dynamic indicators, and the dynamic indicator module is configured to determine an average color value of a subset of the plurality of dynamic indicators.

In another aspect of the present disclosure, which may be combined with any other aspect listed herein unless specified otherwise, the subset is selected based on (i) orientation of the barcode symbol in relation to the reading apparatus, (ii) position of a respective dynamic indicator of the plurality of dynamic indicators in relation to the barcode symbol and the reading apparatus, (iii) distance between a respective dynamic indicator of the plurality of dynamic indicators and the reader, and/or (iv) distance of a respective dynamic indicator to an outside edge of the barcode symbol.

Additional features and advantages of the disclosed system, method, and apparatus are described in, and will be apparent from, the following Detailed Description and the Figures.

BRIEF DESCRIPTION OF THE FIGURES

FIG. 4 is a table of reflectance values obtained from dynamic indicators on flat and curved surfaces based on reader orientation.

FIG. 6A illustrates arrays of RGB intensity values of an image, according to an example embodiment of the present disclosure.

FIG. 6B illustrates the RGB intensity values of FIG. 6A in an example array, according to an example embodiment of the present disclosure.

DETAILED DESCRIPTION OF EXAMPLE EMBODIMENTS

Figure 1A:
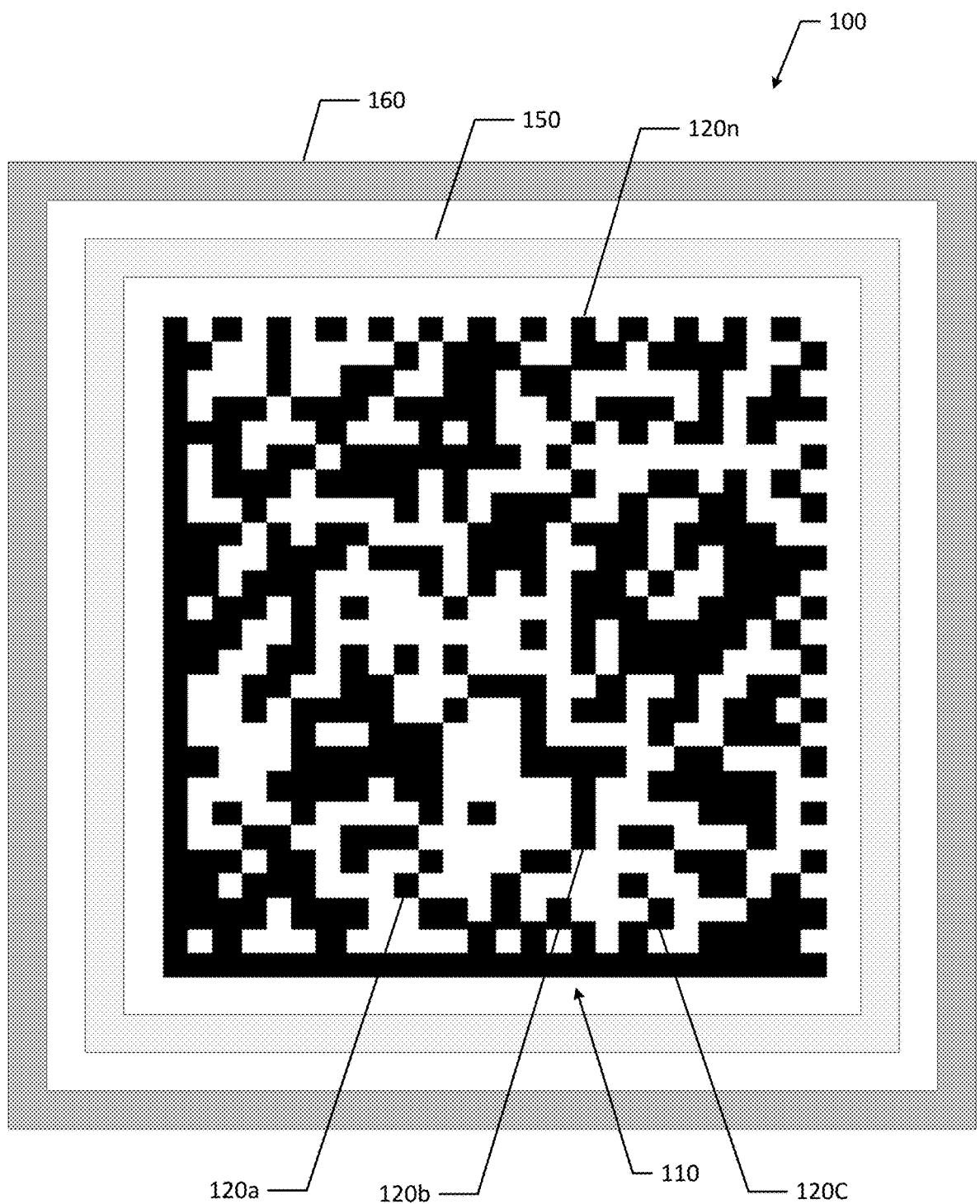
FIG. 1A is a representation of an indicator with 2D barcode (e.g., a 26×26 Data Matrix) surrounded by a dynamic indicator and a reference region, according to an example embodiment of the present disclosure.

Prior approaches to associating bar codes with dynamic indicators have been with one-dimensional (linear or 1D) barcodes that either become unreadable or change with stimuli. Additionally, there have been a plurality of 1D barcode patent applications that combine environmental measurements into data value of 1D barcodes. However, the techniques applicable to 1D barcodes do not appear to be applicable to two-dimensional (2D) barcodes with dynamic environmental monitoring.

The area taken by 1D barcodes limit their practicality in applications where space is critical, e.g., unit of use applications, vials, etc. Two-dimensional barcodes with high-density encoding technologies, for example Data Matrix, may have an encoded area approximately 30 times smaller than a 1D barcode representing the same data.

Some 2D barcodes, with dynamic environmental data typically print a dynamic indicator, such as a dynamic ink (also referred to as an active ink) and the barcode modules in a two layer process where the dynamic indicator is either (i) printed first and static ink of the barcode is overprinted over the dynamic indicator or (ii) the static ink of the barcode is printed first and the dynamic indicator is applied over the static ink. For example, the dynamic indicator may be printed on a substrate first and then static barcode modules (e.g., black modules) may be printed over portions of the dynamic indicator.

Additionally, the static barcode modules (e.g., black modules) may be printed first and the dynamic indicator may be printed over the barcode modules such that approximately half of the dynamic indicator is overprinted on a different material (e.g., the static ink) or on a different color. In either of these scenarios, approximately half of the dynamic region is unusable because it is altered by the static barcode that is either printed under or printed over the dynamic indicator.

The portions of the dynamic region with static ink that is printed under or printed over the dynamic indicator may be unusable. For example, the static ink may change the color, reflectance or other optical properties of the dynamic indicator. Additionally, the printing process may degrade or otherwise alter the dynamic indicator chemistry making certain modules unusable.

The dynamic indicator may be a dynamic ink (also referred to as an active ink), a sensor dye, or other environmental indicator, such as a dynamic label. In an example, the dynamic ink may be a sensor dye. In another example, the dynamic ink may include a sensor dye along with other compounds or ingredients that form the dynamic ink. The dynamic indicator may be a cumulative environmental indicator, similar to the indicator used in a HEATmarker® VVM label that contains a heat-sensitive material to monitor the cumulative exposure to temperature over time, measured by the mean kinetic temperature ("MKT").

The example 2D barcodes described herein advantageously reduces waste of both dynamic indicators and permanent or static inks, improves color accuracy, reduces the quantity of error correction codewords needed for barcode correction, eliminates the need for error correction codewords to correct a dynamic region within the 2D barcode, and allows for a variety of printing technologies and dynamic inks to be used for the dynamic 2D barcodes.

First, as compared with overprinting techniques, example 2D barcodes described herein advantageously reduces waste of both dynamic indicators and permanent or static inks. In some examples, the active ink or dynamic indicator may be the most costly component in the 2D barcode/indicator combination. Typically, portions of the active ink may be damaged or made unusable by static ink that is either printed under or printed over the active ink.

As described in the example embodiments herein, the active ink is provided in an area outside of the barcode, but near the barcode, and in some examples, partially or completely surrounding the barcode. By providing the active ink in a region outside of the barcode, more of the region of active ink or portions of active ink (e.g., the entire dynamic indicator) may be read by a reader to determine the properties of the dynamic indicator. Additionally, since each portion of active ink (e.g., the entire dynamic indicator) may be read and utilized for analysis, less active ink may be needed for the same colorimetric measuring accuracy as barcodes with overprinted or underprinted dynamic regions positioned within the barcode (e.g., in an invariant area), thereby further reducing waste and cost. Furthermore, the indicator may be more accurately read when placed near the barcode (and the reference region) than at some other more distant location where it is not read together with the barcode (or the reference region). For example, by positioning the barcode, dynamic indicator and/or reference regions near each other, each may be read under similar lighting conditions.

In the scenario where the static barcode modules overlap a dynamic region positioned within the barcode, typically, 50 percent of the active ink modules may be altered or made unusable by the static ink (e.g., approximately 50 percent of the active ink is underprinted or overprinted with static ink). For example, with the approach described in the present disclosure, instead of overprinting the black and white static barcode on a 5 module by 5 module patch of active ink within the barcode, with approximately 12 to 13 modules being unusable, a smaller dynamic indicator (e.g., an indicator with less area than a 5 by 5 module patch of active ink) may be printed outside of the 2D barcode that requires less active ink while maintaining the same accuracy as previous implementations. Applying active ink to smaller regions outside of the 2D barcode may advantageously reduce consumption or waste of active ink for dynamic 2D barcodes. For example, by selectively printing active ink in regions outside, but associated with the barcode, smaller printing operations may be achieved without wasting ink while still ensuring the barcode provides sufficient colorimetric accuracy for the indicator. The dynamic indicator(s) may be sized and shaped to reduce waste during the printing process.

Additionally, dynamic indicator(s) printed outside of the 2D barcode are unaffected by a subsequent printing process. For example, in previous techniques that overprinted part of a dynamic region (e.g., positioned within the barcode) with static ink, those overprinted modules are unusable for color analysis. With the dynamic indicator(s) provided outside of the barcode, each portion of dynamic indicator may be used thereby providing more readable modules for color analysis and color averages in the same sized area. The additional dynamic indicator area may also advantageously provide more colorimetric accuracy for the reader.

Positioning the dynamic region(s) outside of the barcode eliminates error correction for intentionally damaged barcode regions. For example, when printing a dynamic indicator within the barcode, modules are intentionally overwritten or damaged by the dynamic ink (e.g., these intentionally damaged modules require error correction codewords to correct the non-existent static modules that have been replaced with the dynamic indicator). For example, overprinting or underprinting with dynamic ink in a five-module by five-module patch may require error correction from five "utahs" where each utah contains 8 modules, each of which forms one bit of either a data or error correction codeword. In contrast, barcodes with similar accuracy may be printed with a dynamic indicator(s) outside of the barcode such that no error correction for the dynamic indicator is required. As mentioned above, applying active ink to dynamic region(s) outside of the barcode, without overprinting or underprinting on portions of the active ink, advantageously reduces consumption or waste of active ink for dynamic 2D barcodes while ensuring the barcode provides sufficient area and accuracy for the indicator while also leaving additional unused error correction codewords for use elsewhere in recovering the barcode data. It should be appreciated that other dynamic indicator patterns and/or designs may be optimized to reduce waste, increase color accuracy, and reduce error correction needed for the 2D barcode.

Furthermore, providing the dynamic indicator outside of the 2D barcode allows different technologies to be used for printing either the underlying Data Matrix or the dynamic indicator. For example, preventing either the static ink or the dynamic ink from contacting one another, being upon each other, or being overprinted allows different kinds of dynamic indicator chemistries to be used on a previously printed Data Matrix without that dynamic indicator chemistry being known at the time the Data Matrix was printed. The dynamic indicator, such as a dynamic ink can be applied around preprinted Data Matrix barcodes, e.g., on a web of labels having such preprinted codes. Providing the dynamic indicator outside of the barcode may be especially advantageous when the barcode is laser etched. With laser etching, a colored ink (e.g., black ink) is etched away (e.g., burned off), which is problematic when overprinting or underprinting because the dynamic indicator may also be removed during the process when creating white modules. The ability to use different kinds of dynamic indicator chemistries and different printing or application techniques provides additional manufacturing flexibility and costs savings.

Additionally, by providing the dynamic indicator(s) and reference region(s) outside of the barcode, the space within the barcode can be used for additional anti-counterfeiting solutions and other types of sensor digital information. For example, other types of sensor digital information may be encoded within the barcode. This includes visual patterns and images of any type, such as ISO or ANSI or ISO warning signs and symbols, or any other type of designed graphic.

Figure 1B:
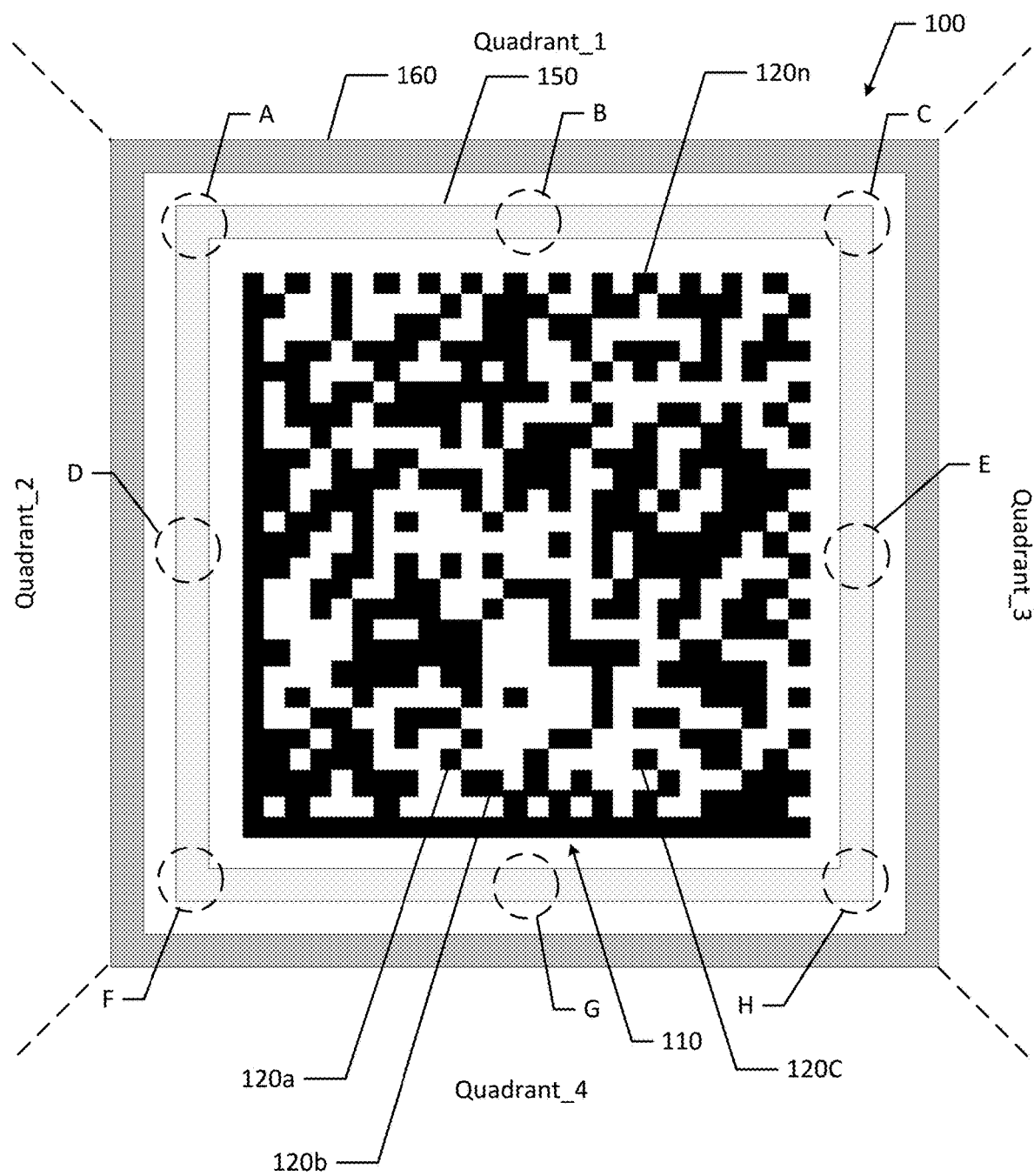
FIG. 1B is a representation of an indicator with 2D barcode (e.g., a 26×26 Data Matrix) surrounded by a dynamic indicator and a reference region, according to an example embodiment of the present disclosure.
Figure 1C:
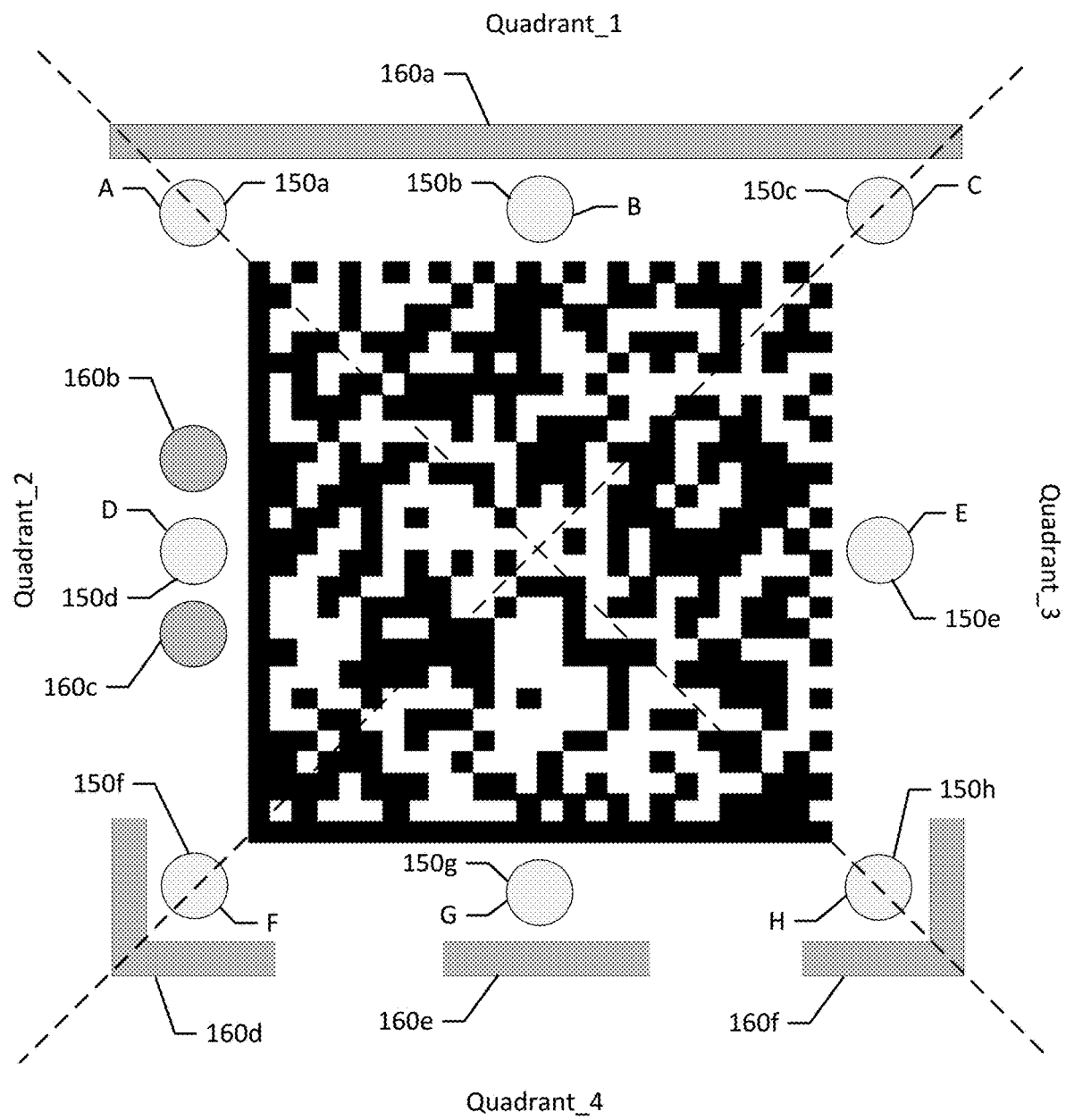
FIG. 1C is a representation of an indicator with 2D barcode (e.g., a 26×26 Data Matrix) surrounded by dynamic indicators and various example reference regions, according to an example embodiment of the present disclosure.

The sensor-augmented two-dimensional indicator 100 (as illustrated in FIGS. 1A, 1B and 1C) may include a substrate with the barcode 110 and dynamic indicator(s) provided on the substrate. The barcode 110 may be provided as an overlayer that is printed on the substrate or an underlayer that is injected within or formed within the substrate. Similarly, the dynamic indicator(s) 150 may also be provided as an overlayer that is printed on the substrate or an underlayer that is injected within or formed within the substrate. The barcode 110 and the dynamic indicator(s) 150 may be printed in either order, so that either the dynamic indicator(s) 150 or the barcode 110 may be the first layer printed on the substrate, the other being printed after the first layer, but neither overlapping the other. Similar to the barcode 110 and dynamic indicator(s) 150, the reference region(s) may be printed in a similar manner.

For example, the barcode 110, the dynamic indicator 150 and/or the reference region 160 may be printed in any order, so that the dynamic indicator 150, the reference region 160 or the barcode may be the first layer printed on the substrate, the others being printed after the first layer, but none of the overlapping the other. Printing is used as one illustrative example of an application process, it should be appreciated that other processes for applying the barcode 110, dynamic indicator 150 and/or reference region 160 to the substrate may be used, such as laser etching, dying, etc. As mentioned above, the barcode 110 may be printed first followed by one or more printing steps to print the dynamic indicator(s) 150 and reference region(s) 160. In another example, the barcode 110, the dynamic indicator(s) 150 and/or the reference region(s) 160 may be printed at the same time.

By providing the dynamic indicator outside and spaced from the barcode 110, the dynamic indicator 150 is unaffected by the printing process of the barcode 110. The indicator may be attached to various products and/or their packaging, such as food products, pharmaceutical products, biologics, or any other product that may benefit from environmental, physical, or biological monitoring. For example, the bar code may be printed on or applied to a container for such a product.

FIGS. 1A, 1B and 1C illustrate representations of a two-dimensional error-correcting indicator 100, which may be referred to herein generally as a 2D indicator 100. The 2D indicator 100 may include a barcode 110 (e.g., a 26×26 Data Matrix), a dynamic indicator(s) 150 and a reference region(s) 160, according to an example embodiment of the present disclosure.

It should be appreciated that a 26×26 Data Matrix is provided for illustration purposes only. A 26×26 Data Matrix contains 72 codewords, each formed of eight modules corresponding to the eight bits of the codeword, referred to as a "utah." The 24×24 bitmap matrix shows the layout of all the 72 codewords in a 26×26 Data Matrix. A "utah" is an arrangement of 8 modules to encode one codeword. It may be arranged either as a single connected group with a pattern frequently in the shape of the State of Utah in Data Matrix, or formed as two subgroups of connected modules split across two or more utah patterns. The systems and methods described herein may apply to other Data Matrix sizes and other styles of 2D barcodes. For example, the Data Matrix may be 10×10, 12×12, 14×14, 40×40, up to 144×144 and may have 8, 12, 18, 162 or 2178 codewords respectively. Additionally, it should be appreciated that the example embodiments disclosed herein may translate to various 2D barcodes including an Aztec Code, Code 1, CrontoSign, CyberCode, DataGlyphs, Data Matrix, Datastrip code, EZcode, High Capacity Color Barcode, InterCode, MaxiCode, MMCC, NexCode, PDF417, Qode, QR code, ShotCode, SPARQCode, and the like.

The 2D barcode 110 includes a plurality of modules 120a-n in a permanent or static color state (e.g., black modules). As illustrated in FIG. 1A, the dynamic indicator(s) 150 may occupy a hollow rectangular of square region surrounding the 2D barcode 110. Additionally, the dynamic indicator(s) 150 may be positioned in different spaces surrounding the barcode 110 that comprise a dynamic indicator 150 (e.g., a dynamic ink). The dynamic indicator 150 may be a continuous region surrounding the 2D barcode 110 (as illustrated in FIG. 1A) or may partially occupy the space around the 2D barcode 110 in different dynamic regions (as illustrated in FIG. 1C).

Each module (e.g., modules 120a-n) of the Data Matrix symbol may be used to encode one bit of data. For example, each module in the barcode 110 is colored either nominally colored (e.g., black) or nominally empty or clear (e.g., white). Nominally colored modules may be black when printed on a light substrate or may be a lighter color when printed on a dark substrate. The nominally empty or clear modules may not require any printing and may instead allow the substrate to show through. It will be appreciated that the example approach may be extended to multi-color barcodes. The module matrix is the visual manifestation of the binary bitmap matrix contained with the area of the symbol bounded by the Finder Pattern. The Finder Pattern may be an 'L' formed by connected solid lines along two edges of the symbol module matrix, with a Clock Track formed by an alternating pattern of white and black modules along the opposite edges of the symbol (See FIGS. 1A, 1B and 1C). It will be appreciated that in other bar code symbologies, other finder patterns may be employed.

The barcode 110 may be a two-dimensional error-correcting barcode symbol, which may be provided in a permanent or static color state. The modules may optionally be square, rectangular, or circular. The surrounding dynamic indicator(s) 150 has a chemistry that is predictably responsive to a specified environmental condition, undergoing a chemical or physical state change between an initial state and an end state. The chemical or physical state change may be a continuous state change, causing a continuous color change in the color state of the dynamic indicator or a binary color state change once the measured environmental parameter crosses a predefined threshold. The barcode may optionally include one or more reference region(s) 160, such as color reference patches of known reflectivity to be used in auto-reference of the barcode scanner at the reading color of interest. The reference region(s) 160 (e.g., color calibration patches) may be positioned adjacent to the barcode 110 and dynamic region(s) 150.

In FIG. 1B, dynamic indicator 150 may have established reading areas (e.g., areas "A", "B", "C", "D", "E", "F" and "G"). For example, when taking a reading of the dynamic indicator 150, the reader may take an average or mean value of multiple readings from different portions of the dynamic indicator 150. Some of the reading areas or read points may include one or more of, or a combination of reading areas (e.g., areas "A", "B", "C", "D", "E", "F" and "G"). As described in more detail below, the indicator reader may select which reading points to measure (and perhaps average, compare, weigh, etc.) based on the orientation of the indicator 100. For example, the reader may measure and average color values of the three reading areas that are closest to the reader.

FIG. 1B illustrates that the space surrounding the barcode 110 on the substrate has four quadrants (e.g., quadrant_1, quadrant_2, quadrant_3 and quadrant_4). Each quadrant may be associated with an edge or side boundary of the barcode 110. Quadrant_1 is associated with the top edge of the barcode 110, quadrant_2 is associated with the left edge of the barcode 110, quadrant_3 is associated with the right edge of the barcode 110 and quadrant_4 is associated with the bottom edge of the barcode 110. One or more dynamic indicator(s) and reference region(s) may be positioned with each respective quadrant. In an example, the dynamic indicator(s) 150 and reference region(s) 160 are positioned as close to the barcode 110 as possible while remaining outside of the barcode 110 to improve detection and readability. For example, a reader may first locate the edges of the barcode 110 and then move outward until the reader locates the dynamic indicator(s) 150 and/or reference region(s) 160. By positioning the dynamic indicator(s) 150 and reference region(s) 160 adjacent the edges of the barcode 110 or nearly adjacent the edges of the barcode 110 (e.g., with a spacing or separation of one module), then the reader may advantageously perform faster reading and decoding operations due to a smaller image capture window.

As illustrated in FIG. 1C, the barcode 110 may be surrounded by multiple dynamic indicators 150a-h. For example, a dynamic indicator 150 may be positioned at each of the established reading areas (e.g., areas "A", "B", "C", "D", "E", "F" and "G") described in FIG. 1B. FIG. 1C also illustrates various examples of reference region shape and placement. It should be appreciated that the shape of the dynamic indicators 150a-h may be different than that illustrated in FIG. 1C. For example, the dynamic indicator(s) 150 may be square, rectangular, or circular, etc. Additionally, there may be one dynamic indicator 150 associated with a barcode 110, one dynamic indicator 150 per quadrant or multiple dynamic indicators 150 per quadrant.

The reference region 160 may surround each of the dynamic indicators 150a-h in a rectangular or square shape similar to that illustrated in FIGS. 1A and 1B. In another example, the reference region(s) 160 may form a band adjacent to several dynamic indicators 150 (e.g., reference region 160a in the shape of a band positioned near and adjacent to indicators 150a-c). The reference regions(s) 160 may also be shaped similar to and surround associated dynamic indicator(s) 150 (e.g., reference regions 160a-b associated with dynamic indicator 150d). FIG. 1C illustrates reference regions(s) 160d-f positioned near the bottom of quadrant_2 and quadrant_3 and along the bottom edge of the barcode 110 in qudrant_4 of the indicator 100, which may correspond to dynamic regions 150f-h respectively. The indicator 100 may also include one or more reference regions 160a-f. It should be appreciated that the shape of the reference region(s) 160 may be different than that illustrated in FIG. 1C. For example, the reference region(s) 160 may be square, rectangular, or circular, etc. Additionally, there may be one reference region 160 associated with a barcode 110, one reference region 160 per quadrant or multiple reference regions 160 per quadrant. Additionally, the reference region(s) 160 may have a one-to-one relationship with the dynamic indicator(s) 150.

In an example, the dynamic indicators(s) 150 may include two different dynamic inks. For example, each dynamic indicator 150 may include one or more dynamic inks. Alternatively, different dynamic indicators 150 may be designated for different dynamic inks (e.g., dynamic indicators 150a, 150c, 150f and 150h may contain a first dynamic ink while dynamic indicators 150b, 150d, 150e and 150g may contain a second dynamic ink). Each of the dynamic inks may change in response to or exposure to different environmental conditions. For example, an indicator 100 may be used on a product that can spoil based on levels of temperature or UV exposure. The indicator 100 may include a dynamic indicator(s) 150 with two different dynamic inks adjacent to one other (e.g., one dynamic ink may monitor UV exposure while another dynamic ink may monitor temperature exposure).

The barcode 110 may be aligned with the dynamic indicator(s) 150 before printing to ensure that the dynamic indicator(s) 150 is properly positioned around the barcode 110. For example, the dynamic indicator(s) 150 may be positioned within and occupy space on the substrate in at least two or more quadrants around the barcode 110. The dynamic indicator 150 may be positioned near the 2D barcode 110 such that it is still associated with the barcode during scanning. It should be appreciated that the dynamic indicator 150 may be positioned in other regions or positions within the 2D barcode 110 (e.g., in the invariant area illustrated in FIGS. 2A, 2B and 2C).

Figure 2A:
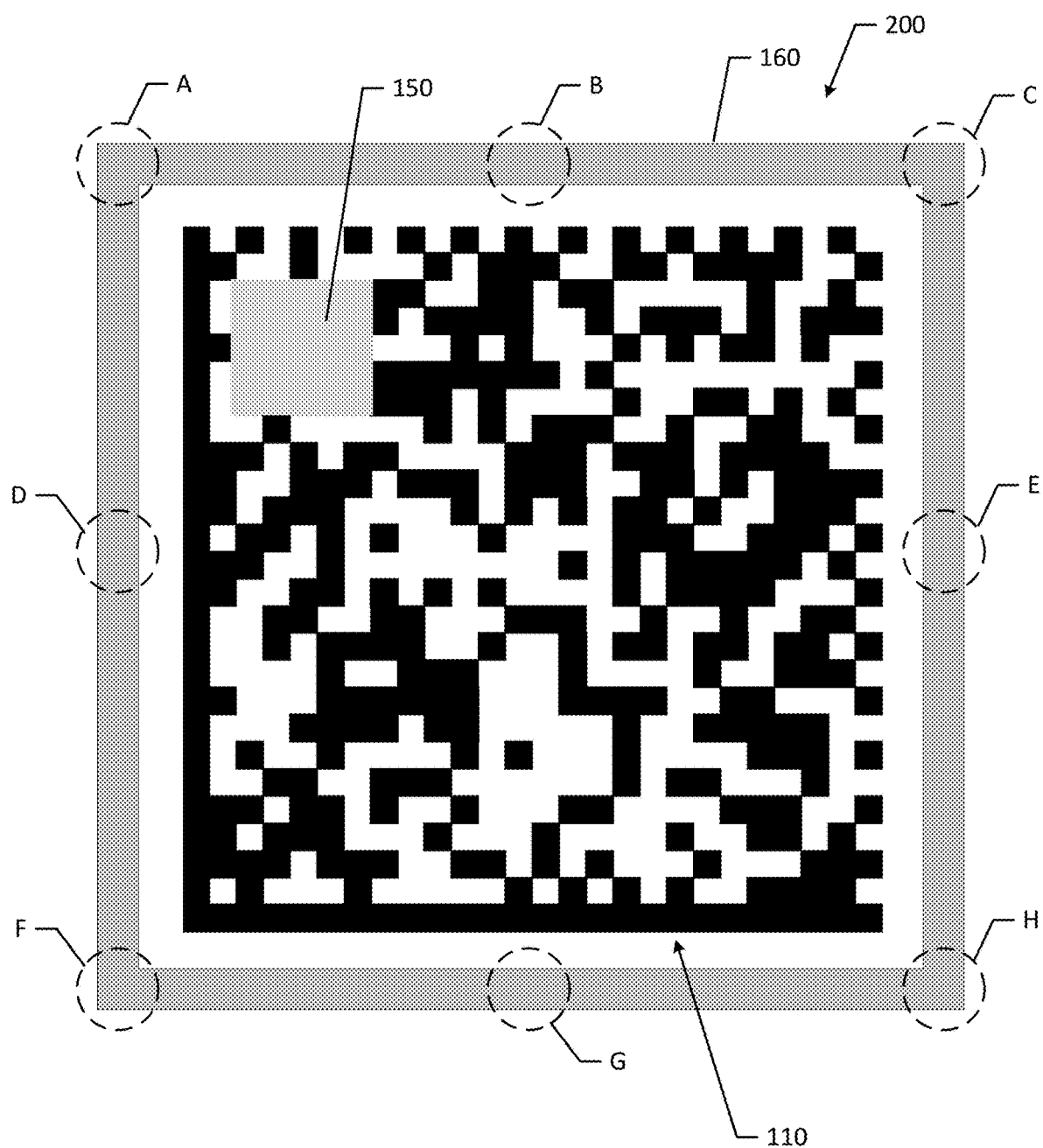
FIG. 2A is a block diagram of an indicator with a 2D barcode (e.g., 26×26 Data Matrix) with a dynamic indicator in the invariant space and surrounded by a reference region, according to an example embodiment of the present disclosure.
Figure 2B:
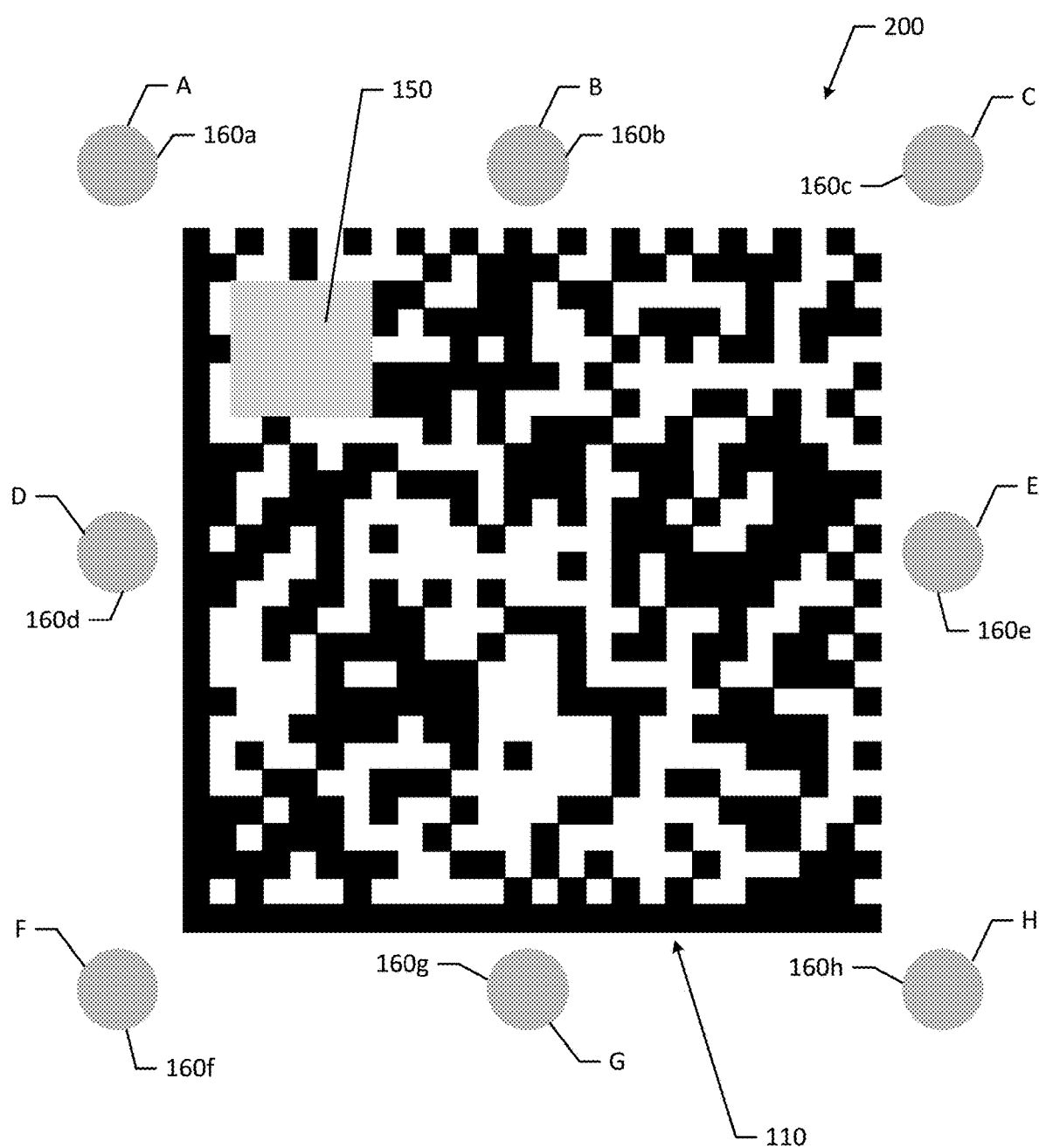
FIG. 2B is a block diagram of an indicator with a 2D barcode (e.g., 26×26 Data Matrix) with a dynamic indicator in the invariant space and surrounded by reference regions, according to an example embodiment of the present disclosure.
Figure 2C:
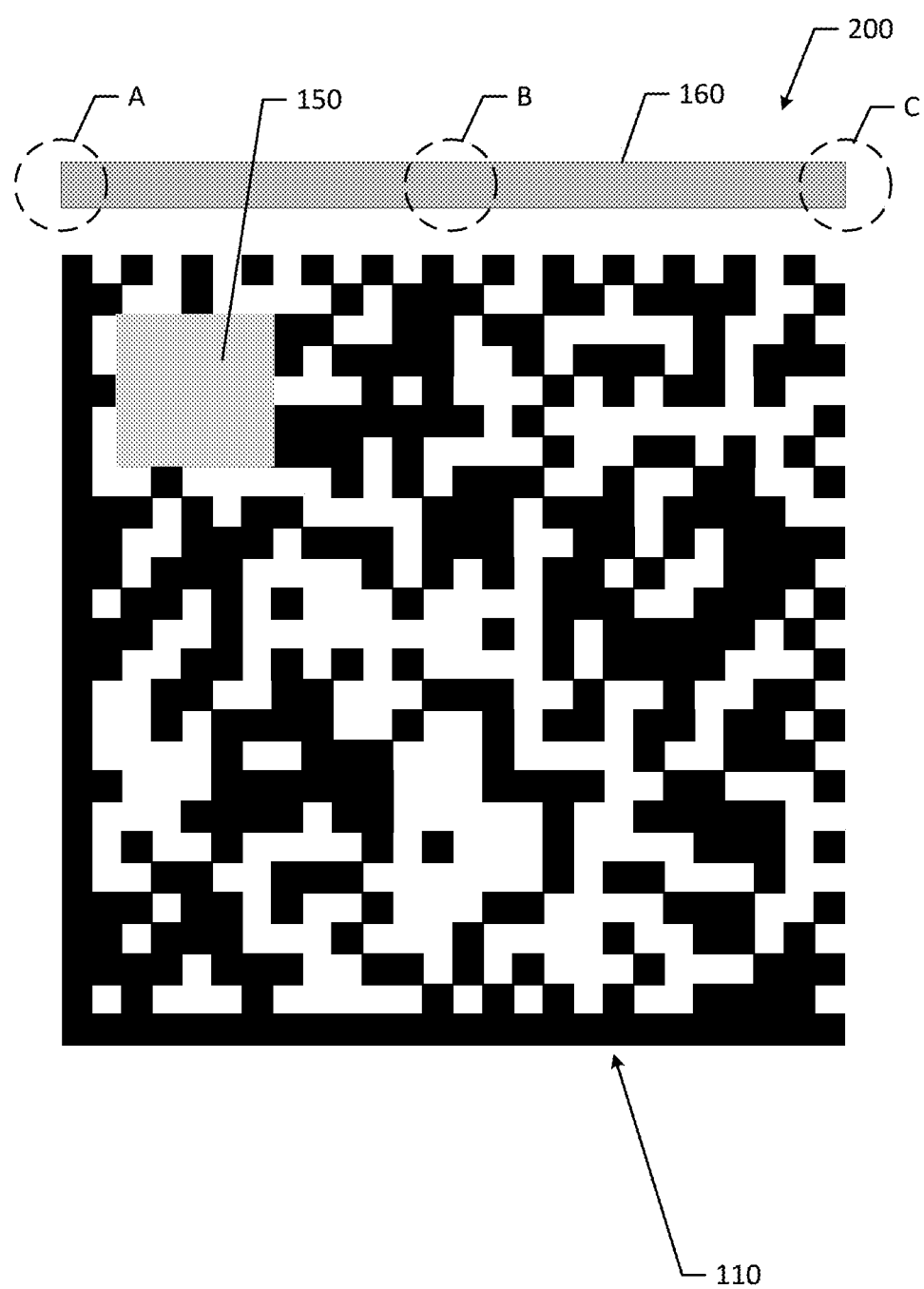
FIG. 2C is a block diagram of an indicator with a 2D barcode (e.g., 26×26 Data Matrix) with a dynamic indicator in the invariant space and provided with a reference region spaced from an edge of the 2D barcode, according to an example embodiment of the present disclosure.

For example, indicators 200 illustrated in FIGS. 2A, 2B and 2C may include a dynamic indicator 150 positioned within the 2D barcode 110 and a reference region(s) 160 positioned outside of the barcode 110. In FIG. 2A, reference region 160 may have established reading areas (e.g., areas "A", "B", "C", "D", "E", "F" and "G"), similar to reading areas of dynamic indicator 150 of FIG. 1B. For example, when taking a reading of the reference region 160, the reader may take an average or mean value of multiple readings from different portions of the reference 160. Some of the reading areas or read points may include one or more of, or a combination of reading areas (e.g., areas "A", "B", "C", "D", "E", "F" and "G"). As described in more detail below, the indicator reader may select which reading points to measure (and perhaps average, compare, weigh, etc.) based on the orientation of the indicator 100. For example, the reader may measure and average color values of the three reading areas that are closest to the reader.

As illustrated in FIG. 2B, reference region(s) 160a-h may be positioned at established reading areas (e.g., areas "A", "B", "C", "D", "E", "F" and "G"), similar to the reading areas for the dynamic indicator 150 described in FIG. 1C. It should be appreciated that the shape of the reference region (s) 160a-h may be different than that illustrated in FIG. 2B. For example, the reference region(s) 160 may be square, rectangular, or circular, etc. Additionally, there may be one reference region 160 associated with a barcode 110, one reference region 160 per quadrant or multiple reference region(s) 160 per quadrant. FIG. 2C illustrates another example where the reference region 160 is positioned alone one edge or side boundary of the barcode 110.

It should be appreciated that by using error correction, a dynamic indicator 150 can advantageously be used within a 2D barcode, such as in the invariant area, without affecting the readability of the 2D barcode. Through the use of error correction, such as ISO 16022 Reed-Solomon Error Correction process, which corrects any erroneously identified modules, included in the modules in the dynamic region (e.g., in the invariant area), the underlying Data Matrix is recovered. Thus, data from the underlying Data Matrix is advantageously processed in the standard manner without being corrupted by the continuously changing color of the dynamic indicator 150. Therefore, static product data can be read from the barcode region of the 2D barcode while dynamic product data, such as remaining product life, embedded within the barcode continuously changes due to environmental exposure.

Each of the examples in FIGS. 1A, 1B, 1C, 2A, 2B and 2C may have the orientation of the dynamic indicator(s) 150 and reference region(s) 160 flipped. For example, in FIG. 1A, the dynamic indicator 150 may be positioned in the outer-most hollow square while the reference region 160 is positioned in the hollow square closest to the barcode 110. Similarly, in FIG. 2A, the reference region 160 may be positioned within the barcode 110 while the dynamic indicator is positioned outside of the barcode.

The barcode 110 and the dynamic indicator(s) 150 or a combination of the barcode 110 and the dynamic indicator(s)

150 may be optically readable by a device and readable by a human. In another example, one of the barcode 110 and the dynamic indicator(s) 150 may be readable by a device and unreadable to a human. Additionally, both the barcode 110 and dynamic indicator(s) 150 may not be human readable (e.g., the dynamic indicator is in the UV spectrum and unreadable by a human). Specifically, the 2D barcode 110 may be entirely human visible, only the dynamic indicator 150 may be human visible, or none of the 2D barcode 110 may be human visible.

The dynamic indicator(s) 150 may transition between an initial state and an end state. For example, the dynamic indicator 150 may transition to an intermediate state and later transitions to an end state. The dynamic indicator(s) 150 may change color from being clear in the initial state, to a plurality of intermediate color states where the dynamic indicator(s) 150 changes to a faint color and becomes less and less opaque until it reaches a solid color at the end state. However, as discussed above, the dynamic indicator 150 may have different shapes and sizes and may occupy one or more quadrants of space surrounding the barcode 110. In an example, the dynamic indicator(s) 150 may continuously (as contrasted with step-wise) change color state in response to environmental conditions.

An indicator 100 with the dynamic indicator(s) 150 in an initial state may represent an associated product that has 100% remaining life. For example, indicator 100 or 200 with 2D barcode 110 may be an indicator on a medical product (e.g., inactivated Polio vaccine) that may be scanned to reveal product lifetime data, such as a Monitor Category: VVM7 ("vaccine vial monitor" with a nominal L=7 day usage life), 80 percent life remaining, and expiration date (e.g., calculated from the estimated remaining life or based on some other criteria). Additionally, the barcode data may include Application Identifiers AI (01) for a GTIN, AI (10) batch number, and AI (21) serial number that are displayed by the reader (e.g., 2D barcode reader). The static barcode data in the barcode 110 may contain sensor information, for example using AI (8009), such that the reader is automatically provided with the appropriate equation parameters and inputs to calculate the remaining product life according to the current color state of the dynamic indicator(s) 150. After reflectance data is obtained from the image sensor, the appropriate equation parameters can be used to determine equivalent exposure time ($t_e$) at the reference temperature. For example, subtracting ($t_e$) from the lifetime gives the remaining product life at the reference temperature.

The 2D barcode 110 may include one or more data identifiers ("DI"), for example, Application Identifiers ("AI") such as AI (01) for a GTIN-14 of the product, an AI (10) for lot number, an AI (17) for product expiration of the lot, AI (21) for a serial number of the time-temperature label, and an AI that indicates the barcode includes a temperature exposure indicator. Additionally, using an AI (90), AI (8009) or another part of the Data Matrix barcode data may identify or form the size and/or location of the dynamic indicator, such as the temperature exposure indicator. An additional AI or other method of data encodation may be used in the 2D barcode having parameters that describe the Arrhenius kinetics of the chemical reaction equation of the color response to the sensor's specific environmental factor. In another example, the same AI may specify both the size and location of the dynamic indicator along with the product life equation parameters. After the indicator 100, 200 (e.g., Data Matrix barcode 110, the dynamic indicator 150 and/or the reference region 160) is printed, the sensor—enabled barcoded labeled product is distributed through its normal supply chain to an end user. In another example, the same AI may specify both the size and location of the dynamic indicator along with the product life equation parameters.

As discussed above, the dynamic indicator(s) 150 may transition between an initial state and an end state. For example, the dynamic indicator(s) 150 may change from clear or colorless in the initial state to a faint color in the intermediate state. To ensure accuracy of product life calculations, the 2D barcode 110 may be encoded such that a threshold value of opacity or reflectance in the dynamic indicator(s) 150 is identified as the end of the product life. For example, the 2D barcode 110 may be encoded such that the reader determines that the dynamic indicator reaching an end state reflectance R(endpoint) is expired, which may allow a reader to determine how long a product has been expired.

For example, if the product expiration was set at the final reflectance percentage end state R($\infty$) of the dynamic indicator, then the rate of change of reflectance may be too slow to practically determine when the dynamic indicator(s) (e.g., dye patches or dynamic ink) had reached the end state. However, if the expiration is set at an intermediate state, which is before the end state R($\infty$), the indicator 100 may be configured to also provide information about cummulative environmental exposure after expiration.

The dynamic indicator may then transition from the intermediary state to an end state or to a second intermediary state (e.g., the expired state) before the end state. The end state may be used as the threshold value that indicates that the product has exceeded its suitable life. For example, the reader may display "Test Failed". Due excessive exposure to time, temperature, or both time and temperature, the product may have no remaining life. Regardless of the color state of the dynamic indicator(s) 150, the static 2D barcode 110 advantageously carries the same GTIN, batch number, serial number, etc. and carries the parameters necessary to implement the R(t) equation.

DYNAMIC INDICATOR POSITIONING ADVANTAGES

As discussed above, providing the dynamic indicator(s) 150 outside of the barcode 110 may prevent damage to the dynamic indicator 150 or active ink when the barcode 110 is printed. For example, during thermal or thermal transfer printing, heat from a thermal print head may degrade the dynamic indicator if it is positioned near the printing operation. For example, printing the permanent or static color state modules 120a-n in a static or permanent ink near the dynamic indicator 150 may affect the dynamic indicator chemistry (e.g., printing process may involve the application of light or heat that may affect the dynamic indicator).

By providing the dynamic indicator(s) 150 on the substrate in an area outside of the barcode 110, the dynamic indicator(s) 150 is unaffected by the printing process. Even if the dynamic indicator(s) 150 is printed after the barcode 110, the static or permanent ink may affect the chemistry of the substrate near the printing process and thus may affect the dynamic indicator(s) 150 in that region. As mentioned above, providing the dynamic indicator(s) 150 outside and spaced away from the barcode 110 (e.g., neither under-printed or overprinted by the barcode 110) may negate or reduce the effects of the heat or light applied by the printing process, which may degrade the dynamic indicator. The spacing between the barcode 110 and the dynamic indicator(s) 150 may provide a buffer region such that a predetermined spacing exists between the dynamic indicator 150 and the static ink to ensure that the subsequent print action does not degrade the dynamic indicator chemistry.

Another advantage to providing the dynamic region(s) 150 in an area outside of the barcode 110 is that the dynamic regions(s) are more visually distinguishable to a user. For example, when the dynamic indicator(s) 150 is activated, the dynamic indicator(s) 150 has adequate contrast compared to the empty or colorless space between the dynamic indicator(s) 150 and the barcode 110.

For example, the dynamic indicator(s) 150 may be adapted to be visually distinguishable and perceivable by a user. For example, the user may quickly recognize the shape or arrangement of the dynamic indicator(s) 150 to determine a status of the two-dimensional barcode 110 and thus the product the barcode is attached to. The shape of the dynamic indicator(s) may indicate that the product is expired, which the user can quickly see without having to scan the item.

Additionally, by positioning the dynamic indicator(s) 150 and/or reference region(s) 160 around the barcode 110, the barcode 110 is advantageously readable from different reading angles and orientations. Specifically, with a dynamic indicator 150 and reference region 160 surrounding the barcode 110, the reader may obtain an accurate read of the barcode 110 as well as the dynamic indicator 150 and reference region 160 regardless of the scanning position.

The area of the barcode 110 may be specified such that it is the minimum area to provide enough information for the product. By positioning the dynamic indicator(s) 150 outside of the barcode, error correction for the dynamic indicator(s) 150 is unnecessary and the resulting barcode 110 can be smaller than if the dynamic indicator(s) 150 were positioned within the barcode 110. For example, as with other techniques that include the dynamic region(s) within the barcode 110, as the dynamic indicator(s) 150 increases in size, more modules or bits are intentionally damaged and thus will require error correction. As the number or error correction codewords increases, the size of the barcode 110 increases to accommodate those codewords. The area of the barcode 110 may also be specified such that it is the minimum area to provide enough information for the product as well as reference information for the dynamic indicator(s) 150 and/or reference region(s) 160. For example, the barcode 110 may include information that instructs a reader about the properties (e.g., size, location, shape, etc.) of the dynamic indicator(s) 150 and reference region(s) 160.

Data is encoded in a Data Matrix as a sequence of 8-bit codewords, or symbol character values. Codewords may either contain data or Reed-Solomon error correction (RSEC) check character values. It will be appreciated that the general approach described herein may use other codeword sizes, other data layouts, and other forms of error correcting codes, and that this common Data Matrix is only described as an example.

For a complete and normative description of the method of error correction employed in DataMatrix see the current version of International Standard ISO/IEC 16022, "Information technology—Automatic identification and data capture techniques—Data Matrix bar code symbology specification."

Many types of error correcting codes may be used to encode sensor digital information. Typically encoded is a dynamic indicator bit pattern of binary-encoded sensor data. Useful error correcting codes include Hamming Codes, Bose-Chaudhuri-Hocquenghem Codes, Golay Codes, Simplex Codes, Reed-Muller Codes, Fire Codes, Convolutional Codes, and Reed-Solomon Codes.

DYNAMIC INK

In an example embodiment, the dynamic ink or dynamic indicator(s) 150 may be sensitive to an environmental factor such as temperature, time, time and temperature, freezing, radiation, toxic chemicals, or a combination of such factors, or the like. In an example embodiment, the ink may be a thermochromic ink, such as a water-based irreversible thermochromic ink designed to change permanently from white to black at 40° C. Additionally, the thermochromic ink may be reversible. For example, the reversible thermochromic ink may be a liquid crystal ink or a leuco dye ink (examples include QCR Solutions Reversible Thermochromic Inks and H.W. Sands Corporation inks). The ink may also be a photochromic ink (e.g., changes based on exposure to UV light). The ink may be an ink sensitive to time and temperature (an example includes the OnVu indicator).

The dynamic ink may change from a darker color to a lighter color, a lighter color to a darker color, may change levels of transparency or opacity, and/or may change levels of reflectivity or absorptivity, or may change any other suitable characteristic allowing the barcode to be readable in one or more states by a reader. Additionally, the dynamic ink may continuously change between a range of an initial color state to an end color state.

For example, a dynamic ink may change from a lighter color to a dark blue, which may be alternatively transformed by a reader to values on continuous "greyscale". The greyscale (which is not necessary truly grey but is a continuous tone of some hue) is determined reducing the R, G and B values of each pixel to a single greyscale value by a formula of form:

$$\text{Greyscale value} = (aR+bG+cB)/K$$

Where $\{a, b, c\}$ represent the relative contribution of each sRGB color in the pixel, and K is scaling factor. Additionally, a dynamic ink or dynamic indicator may continuously change from a white or clear color to a dark red or blue (e.g., changing from white, to a faint red, become less and less opaque until it reaches a solid red color at the end color state). Moreover, any suitable combination of colors may be used for the states of one or more dynamic inks.

METHODS

Figure 3:
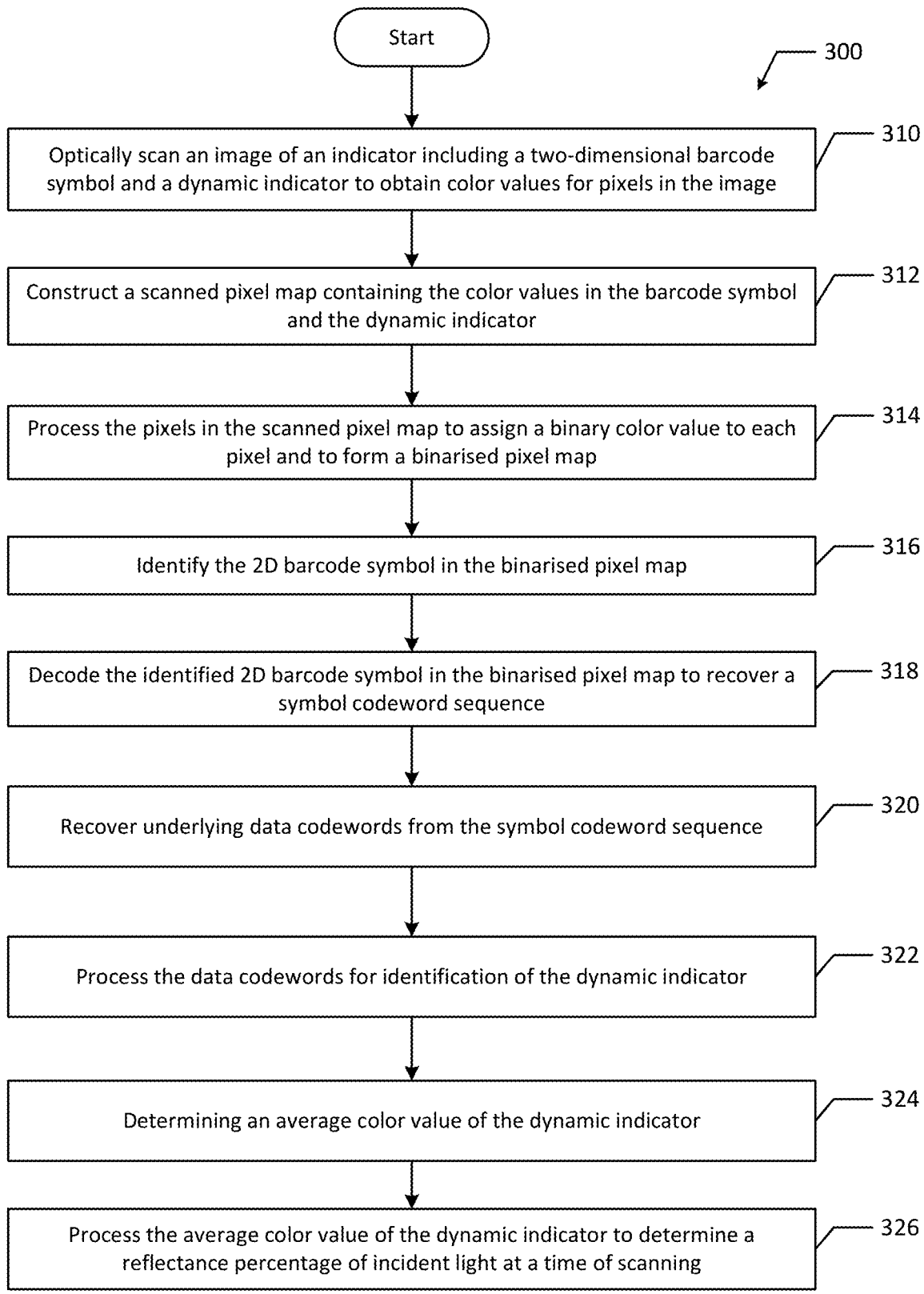
FIG. 3 is a flowchart illustrating an example process for reading an indicator, according to an example embodiment of the present disclosure.

FIG. 3 illustrates a flowchart of an example method 300 for reading an indicator, according to an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. The method 300 may be performed by processing logic that may comprise hardware (circuitry, dedicated logic, etc.), software, or a combination of both.

The example method 300 includes optically scanning an image of an indicator 100, 200 to obtain color values for pixels in the image (block 310). The indicator 100, 200 includes a 2D barcode 110 and dynamic indicator 150, such as a historical environmental condition indication (e.g., a time-temperature indicator ("TTI")), which may be scanned at any point in the supply chain (e.g., using a smartphone carrying a TTI reader App, or other special barcode reader) to ensure that the TTI labeled product has not yet expired. The dynamic indicator 150 may be provided in an area outside of but surrounding the barcode 110. Once the 2D barcode is scanned, and the reflectivity percentage of the dynamic indicator 150 is determined, the reader device may determine the remaining labeled product life, expended product life, or an expected expiration date. For example, given the remaining product life and the current temperature, the reader may estimate the expiration date of the product if continuously stored at the reference temperature, and additionally if stored at another lower temperature.

Next, method 300 includes constructing a scanned pixel map containing the color values in the barcode symbol 110 and the dynamic indicator 150 (block 312). After scanning and optically processing an image of the indicator 100, 200 using a barcode imager or color camera using a pixel color identification system such as preferably sRGB, a scanned pixel map may be constructed, the scanned pixel map containing the preferably sRGB color value of the pixels in the scanned modules of the two-dimensional barcode symbol and the dynamic indicator. The sRGB value of the pixels contain color contributions from both the barcode and the dynamic indicator.

Optionally, the scanning process may include reading of one or more preprinted reference regions (e.g., color calibration patches) positioned near the barcode symbol and the dynamic indicators 150 as part of the scanned pixel map. Optionally, these reference region(s) 160 may be preprinted as part of the barcode 110 (e.g., within the barcode 110) or outside of the barcode 110.

Then, method 300 includes processing the pixels in the scanned pixel map to assign a binary color value to each pixel and form a binarised pixel map (block 314). For example, the pixels of the modules in the scanned pixel map are then processed using thresholding algorithm and/or voting algorithms to assigned a binary color value to each pixel, to form an equal-sized binarised pixel map. Additionally, method 300 includes identifying the 2D barcode symbol in the binarised pixel map (block 316). For example, the 2D barcode symbol may be identified from other graphical objects in the binarised pixel map. Next, the method includes decoding the identified 2D barcode symbol in the binarised pixel map to recover a symbol codeword sequence (block 318). For example, the identified 2D barcode may be decoded to construct a symbol codeword sequence from the binarised pixel map. In an example, the color value assignment may utilize the IEC 61966-2-1:1999 standard RGB color space (sRGB).

Method 300 also includes recovering underlying data codewords from the symbol codeword sequence (block 320). Optionally, underlying data codewords may be recovered from the symbol codeword sequence, preferably by utilizing error correction process on the symbol codeword sequence. In an example, the error correction process is Reed-Solomon Error Correction. As mentioned above, error correction may be unnecessary as Next, the data codewords are processed for identification of the dynamic indicator 150 (block 322). Processing the data codewords then determines the location, size, and product life equation parameters of the dynamic indicator 150, and additionally whether reference region(s) 160 (e.g., color calibration patches) are present, and if so their relative location and their reference reflectance value. Method 300 also includes determining an average color value of the dynamic indicator 150 (block 324). For example, the data codewords are processed for identification of the pixels of the dynamic indicator 150, and the average sRGB color is determined.

After determining the average color value, method 300 includes processing the average color value of the dynamic indicator 150 to determine a reflectance percentage of incident light at a time of scanning (block 326). Additionally, processing the sRGB color information may optionally include all or some of the steps of: capturing the incident light reflectance of pixels included in the dynamic indicator 150, including both environmentally-sensitive pixels (e.g., portions of the dynamic indicator 150) and reference region(s) 160 (e.g., color calibration patches); creating a colored digital light filter effect on reflectance data from the pixels to generate filtered colored image sRGB values; reducing the filtered colored image values to greyscale values and creating a greyscale pixel map; correcting the relationship between greyscale and reflection percentage based on the reference region(s) 160 (e.g., color calibration patch) values; and determining a reflectance percentage of the incident light at the scanning sample time. As used herein, a pixel map may be a map of binary bits (e.g., a bitmap), ternary bits, etc. For example, a pixel map may include greyscale values or RGB color values. Similar to above, greyscale values may be used in place of color values.

In order to obtain the product life data an image sensor such as a smartphone carrying a TTI App reader, may be used to scan the indicator 100, 200 including a 2D barcode 110 with a surrounding dynamic indicator 150. For example, the image may be captured from an image sensor, such as the smartphone camera, using a flash such as a smartphone white flash. The nominally white flash intensity may overwhelm the ambient light and set the color temperature for image capture by the sRGB sensor of the camera. The image sensor may capture the white incident light reflectance of the pixels, including the dynamic indicator. In lieu of the incident light being a specified color a physical color filter may be positioned over the camera lens when the sRGB image is captured. Alternatively, a digital filter may be applied over the sRGB image pixel map to create a colored light filter effect on the reflectance data. As an example, the digital filter may be programmed to process the sRGB image based on an appropriate center wavelength and range, as in a bandpass filter. Then, the filtered color image RGB values may be reduced to a greyscale value (e.g., range 0 to 255) and a greyscale pixel map for the indicator 100, 200 (e.g., Data Matrix barcode surrounded by a dynamic indicator 150 and/or reference region(s) 160) may be created. In an example, the 2D barcode of the indicator 100, 200 may include encoded data to provide the appropriate inputs and may be used to program a reader for reading color saturation and/or density of the dynamic indicator 150. For example, through encoded data, data identifiers (DIs) and/or Application Identifiers (AIs), the barcode can automatically program the reader to properly sense color reflectivity of the dynamic indicator 150. The encoded data in the data identifiers (e.g., Application Identifiers) may also include the appropriate lifetime equation parameters such that the reader can estimate the used and/or remaining product life at a specified temperature for the scanned product.

The greyscale pixel map of the Data Matrix barcode may then be processed, e.g., using a standard Data Matrix procedure, such as ISO 16022 Data Matrix with modifications such as replacing the ISO 15415 Global Threshold algorithm with the Ultracode Color barcode Symbology dual-threshold ternary algorithm to separate pixels into black pixels, white pixels, and color pixels (i.e., pixels neither black nor white). Once the color pixels are separated from the black and white pixels, the remaining black pixels and white pixels may be processed according to the methods of ISO 16022. For example, this processing method identifies the square module positions and the module centers in the Data Matrix pixel map using only the black and white pixels. The ISO 16022 method then decodes the Data Matrix and recovers the AI data (e.g., GS1 AI data).

As discussed above, a data identifier, such as an Application Identifier, may identify the size, shape and/or location of the dynamic indicator modules. Next, as an example, a group of pixels in each identified dynamic indicator module in the invariant area may be sampled; for example, a 3×3 or larger number of pixels at the center of each module may be sampled. As a widely used example, each pixel value may serve as a vote and the module is categorized as black, white, or color based on a majority vote. In a 3×3 sample, 2 pixels may be voted as black, 6 pixels voted as color, and 1 pixel voted as white. Since 6 is a majority of the 9 total pixels, the module is categorized as color, and the average sRGB color for that module determined by averaging separately the R, G, B values of the 9 pixels voting. The average sensor area sRGB value is formed by averaging separately the R, G, B values of all the identified dye sensor modules. The dynamic indicator is processed to determine the current reflectance percentage R(t) at the time of indicator capture (t). Since the dynamic indicator is provided outside of the barcode, the dynamic indicator is unaltered by the barcode (e.g., the dynamic indicator has not been overprinted with black modules and have not been printed over black modules).

The invariant area is a region of the sensor-enhanced barcode symbol in which the underlying data does not change between barcode symbols identifying similar products, for example, is an unchanging group of number files, and therefore the barcode module pattern in the invariant area does not change between similar products.

By encoding the 2D barcode of the indicator 100, 200 with an AI containing parameters to automatically program the image processing and provide product equation parameters for pre-stored algorithms, the reader can determine product characteristics that are specific to each 2D barcode labeled product utilizing the same reader. For example, using a reader, the remaining product life for a food product may be determined using the image sensor processing and equation parameters indicated by reading the indicator on that food product; different parameters may be stored in an AI in the 2D barcode on a vaccine vial and which the same reader may read and use to program the image processing and equation parameters to calculate the remaining life of vaccine in the vial.

In another example, the barcode data may be utilized to check on product authenticity as an anti-counterfeiting measure. For example, all or part of the encoded AI (01) for a GTIN, AI(10) batch number, and AI (21) data may used as validation data form this product instance. This validation data is sent by the reader as a query to the manufacturer's database to see if that validation data is associated there, meaning that the product carrying that barcode has already been registered. If the validation data is not matched in manufacturer's database, or is marked there previously seen, already used or expired, then the authenticity of this product instance just scanned is questionable. A warning code may be placed in the manufacturer's database that multiple instances of the same barcode have been seen, to warn others who may receive another identical product instance that at least one of the products instances is counterfeit.

As illustrated in FIG. 4, the color assessment of the dynamic indicator(s) may be dependent on the viewing angle. FIG. 4 represents RGB values obtained for specific points along a square shaped dynamic indicator 150 positioned around a barcode 110, which was adhered to a flat surface and a curved surface. Additionally, data values for RGB color were also obtained for specific points along a bar-type dynamic indicator 150 (e.g., similar to the shape of reference region 160a in FIG. 1C) positioned above a barcode 110, which was adhered to a flat surface and a curved surface.

As described above, when a 2D barcode label is adhered onto a flat surface (e.g., cardboard boxes or cartons), the reader application equipped with an image processing program will scan the barcode and read color data (e.g., RGB values of the dynamic indicator). When analyzing a 2D barcode around a curved surface (e.g., wrapped around a glass vial), the image may be distorted to some degree. However, the reader app can be designed to take this curved configuration into account. For example, the reader or reader application may read and analyze color data from the dynamic indicator and/or reference region that is within a predetermined viewing angle (or range). The reader or reader application may read and analyze a portion of color data that is within a predetermined distance of the reader (e.g., color data from dynamic indicators and reference regions that are closest to the reader). Furthermore, the angle at which the image is captured by the app should also be taken into consideration when reading and analyzing the color data. Each color is expressed as a number value on a scale from 0 to 255, where if all values are at zero, the result is black; if all values are at 255, the result is white. As discussed above, the greyscale (which is not necessary truly grey but is a continuous tone of some hue) is determined reducing the R, G and B values of each pixel to a single greyscale value by a formula of form: Greyscale value=(aR+bG+cB)/K, where {a, b, c} represent the relative contribution of each sRGB color in the pixel, and K is scaling factor. As illustrated in FIGS. 6A and 6B and RGB image, such as a 128-by 128 RGB image may be stored in three separate arrays of red intensity values, green intensity values and blue intensity values. The intensity values can be organized in an array, such as a 1-by-1 structure array where each field is a 128-by-128 array or may be organized on an element-by-element basis. For example, the array may be a 128-by-128 structure array where each field is a single data element as illustrated in FIG. 6B.

For the square shaped dynamic indicator 150, the front facing control value produced an average RGB value of 86 for the flat surface. When imaged from the top side, the mean of the three R values taken from the points closest to the reader (e.g., points 1, 2 and 3 corresponding to "A", "B" and "C" of FIG. 1B) was 85. When imaged from the right side, the mean of the three R values taken from the points closest to the reader (e.g., points 3, 5 and 8 corresponding to "C", "E" and "H" of FIG. 1B) was 81. When imaged from the left side, the mean of the three R values taken from the points closest to the reader (e.g., points 1, 4 and 6 corresponding to "A", "D" and "F" of FIG. 1B) was 78. Similarly, when the barcode was imaged from the bottom side, the mean of the three R values taken form the points closes to the reader (e.g., points 6, 7 and 8 corresponding to "F", "G" and "H" of FIG. 1B) was 88. Similarly, the mean values for the curved surface were 103 for the control, 114 for the top side, 99 for the right side, N/A for the left side, and 107 for the bottom side.

Mean R values were also obtained for a bar-type dynamic indicator 150 (e.g., similar to the shape of reference region 160a in FIG. 1C) positioned above a barcode 110. With the barcode 110 on a flat surface, the mean R values for points 1, 2 and 3 were 77 for the front facing (control), 80 for the top side, 61 for the right side, 63 for the left side and 108 for the bottom side. With the barcode 110 on a curved surface, the mean R values for points 1, 2 and 3 were 124 for the front facing (control), 122 for the top side, 83 for the right side, N/A for the left side, and 112 for the bottom side.

Results show that the color value data obtained at the points closest to the camera more closely resemble the color value of the control (i.e., front facing). For the sample having the bar-type dynamic indicator 150 (e.g., solid line above the barcode), the color values for the top side are most similar to the control while the other data points taken from the right, left, and bottom sides vary greatly. This difference is not observed on the 2D barcode sample with the outer squared adhered onto the flat surface. Additionally, the barcode sample with the outer square dynamic indicator 150 that was adhered onto both the flat and curved surfaces has a lower standard of deviation than the solid line positioned above the barcode, which indicates that using a surrounding dynamic indicator (such as a square indicator) advantageously provides more accurate readings than by just using a bar-type dynamic indicator (e.g., solid line) positioned along one side or in one quadrant on the substrate.

Based on the data above and illustrated in FIG. 4, the reader may determine color values for either the dynamic indicator(s) 150 or the reference region(s) 160 based on selected reading points that are closest to the reader at the time of capture. Additionally, color values obtained by the reader may be averaged, weighted, manipulated, etc. to determine a resultant color value. For example, outlier values may be removed from the sample and multiple color values may be used to determine a resultant color value.

In an example, color values may be determined for a subset of the dynamic indicator(s) 150 and/or reference regions(s) 160. The subset of the dynamic indicator(s) 150 and/or reference regions(s) 160 may be selected based on various selection criteria. For example, dynamic indicator(s) 150 and/or reference regions(s) 160 may be selected based on their respective distances from an outside edge of the barcode 110 (e.g., dynamic indicator(s) 150 and/or reference regions(s) 160 with a perceived spacing above or below a threshold spacing may be used for determining color data). Depending on the viewing or reading angle, the distance between a dynamic indicator 150 and the edge of the barcode 110 may appear to be smaller on for the side of the indicator 100 that is angled away from the reader. Specifically, the reader may perceive a smaller distance for a first indicator 150 that angled away from the reader than the distance between a second indicator 150 and the edge of the barcode 110 when the second indicator is on a flatter surface that is in front of the reader.

In another example, the selection criteria may be based on the perceived geometry of the dynamic indicator(s) 150 and/or reference regions(s) 160. Based on the orientation of the indicator, the barcode modules along with the dynamic indicator(s) 150 and/or reference regions(s) 160 will have a different perceived geometry. For example, each of the barcode modules of an indicator 100 on a flat surface will have the same perceived height and width. However, when looking at an indicator 100 on a curved surface or at a different viewing or reading angle, the perceived geometry (e.g., height and width) of the barcode modules may be different. Specifically, for an indicator 100 on a curved surface and a viewing angle normal to the center of the indicator 100, the barcode modules in the center of the indicator 100 are generally perceived as wider than the modules on the left and right side of the barcode 100. Similarly, the perceived geometry of the dynamic indicator(s) 150 and/or reference regions(s) 160 may be different depending on orientation of the indicator 100 and viewing angle. The subset of the dynamic indicator(s) 150 and/or reference regions(s) 160 may be selected based on a predetermined geometry ratio to expected values. For example, a dynamic indicator 150 that has a perceived width below a threshold percent of the expected width may be excluded from color analysis.

READER

Figure 5:
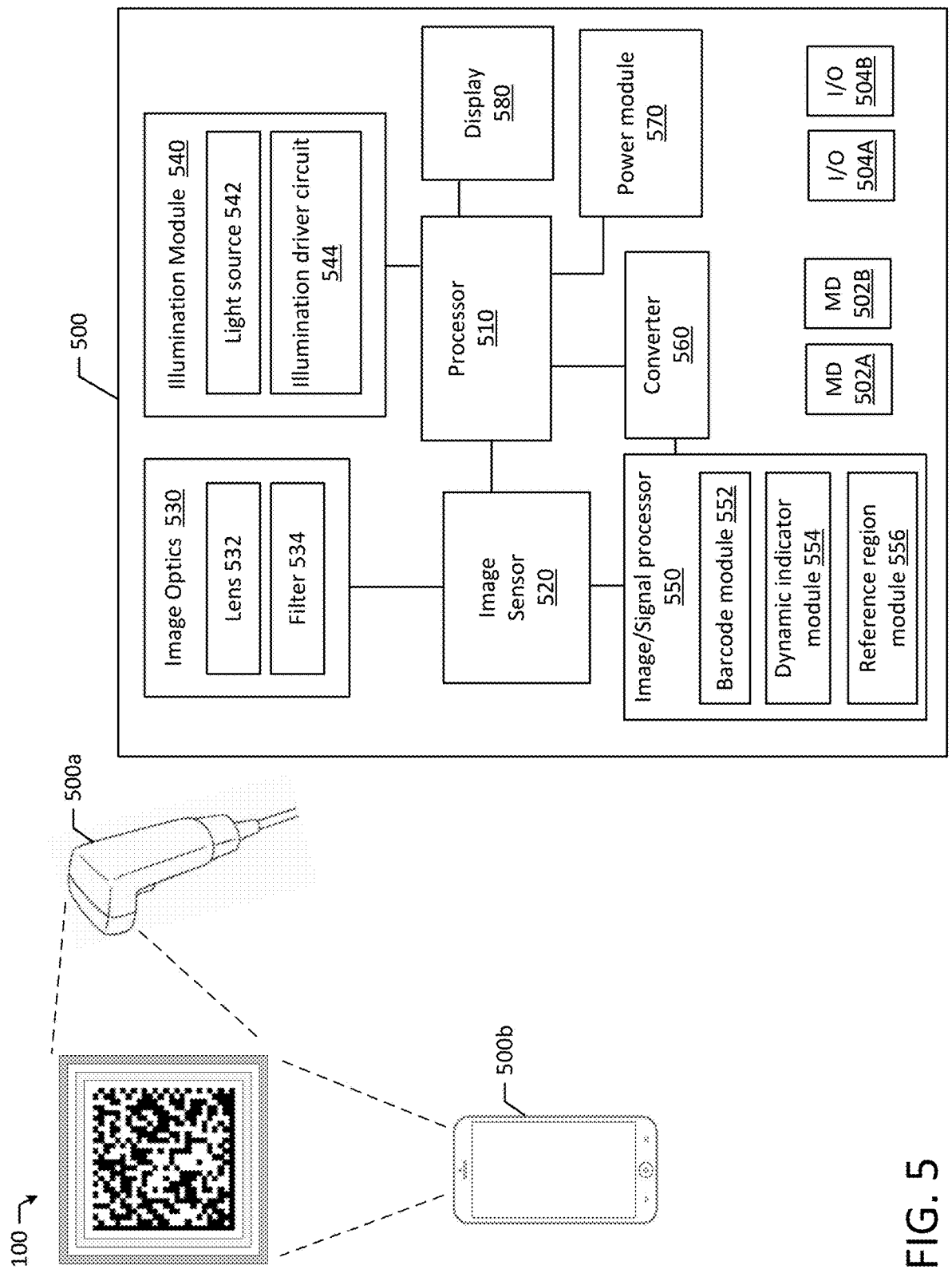
FIG. 5 illustrates an example device for reading bar codes and associated dynamic indicators according to the present disclosure.

FIG. 5 illustrate example devices 500a and 500b (referred to herein generally as reader 500) for reading bar codes and associated dynamic indicators according to the present disclosure. In an example, the reader 500 may be a privileged reader or a non-privileged reader. The reader 500 may be a dedicated barcode reader (e.g., reader 500a) or an apparatus configured to read barcodes (e.g., reader 500b) such as a mobile device, a personal digital assistant or PDA, a smartphone, a laptop, a tablet computer, or a desktop computer, as well as any other user devices. The reader 500 may be adapted to read 1D and 2D barcodes, or may be adapted to read only 2D barcodes. Additionally, the reader 500 may also transmit, receive, or exchange data with other network devices via a communication network. A network device may be a computer, a different reader 500, or any other device accessible via a communication network. Certain data may be stored in the reader 500, which may also stored on a server within the network, either temporarily or permanently, for example in memory or a storage device (e.g., memory devices 502A-B). The network connection may be any type of network connection, such as a cellular or wireless connection, an Ethernet connection, digital subscriber line, telephone line, coaxial cable, etc. Access to a reader 500 or image data obtained by the reader 500 may be controlled by appropriate security software or security measures. An individual users' access may be defined by reader 500 and limited to certain data and/or actions.

The reader may include a processor 510, such as a microprocessor, that is communication with memory (e.g., memory devices 502A-B) and input/output devices 504A-B. The processor 510 may also communicate with an image sensor 520, image optics 530, an illumination module 540, a power module 570 and display 580. The image sensor 520 may receive light from image optics 530, which may include a lens 532 and a filter 534. The image sensor may pass the received light to an image or signal processor 550, which may send the signal to a converter 560 before sending the information to processor 510.

The processor 510 may be an integrated circuit microprocessor, such as a programmable logic or gate array. In an example, processor 510 may provide control inputs to control circuits (e.g., the illumination driver circuit 544) as well as other control circuits (not pictured). For example, the processor 510 may also provide control inputs for the image sensor 520 such as timing inputs.

The image sensor 520 may be a sensor array. The image sensor 520 may be configured to sense or detect light at a specific wavelength (e.g., visible wavelengths, non-visible wavelengths, etc.). In an example, the image sensor 520 may be a CMOS based image sensor array. In another example, the image sensor 520 may be a CCD based image sensor array. The image sensor may include a two-dimensional array of pixels that each includes a photosensitive sensitive region. The image sensor 520 may also be controlled by a sensor control module (not pictured), which may send control signals to the image sensor 520.

The image optics 530 may include lens 532 and a filter 534. It should be appreciated that the image optics 530 may include multiple lenses 532 and/or filters 534. Additionally, the image optics 530 and illumination module 540 may include a variety of optical technologies to achieve illuminating the 2D barcode and receiving reflected light from the 2D barcode. As illustrated in FIG. 5, the illumination module 540 may include a light source 542 and illumination driver circuit 544. The light source 542 may include an LED or bank of LEDs. In another example, the light source 542 may also include a laser diode to indicate a scanning region. The light source is configured to direct light or light energy toward a target object (e.g., a 2D barcode to be scanned). The reflected light or radiation from the target object (e.g., the 2D barcode) may be focused by the image optics 530 (e.g., lens 532) onto the image sensor 520. In an example, the light source 542 is configured to provide light of sufficient intensity to allow the image sensor 520 to capture an image of the 2D barcode. In an example, the illumination driver circuit 544 may cause the light source 542 to emit light, which may pass through various apertures and lenses before reaching the target object (e.g., the 2D barcode).

The image or signal processor 550 may be configured to processing and decode information received and capture by the image sensor 520. For example, the image or signal processor 550 or processor 510 may perform image processing, analysis and/or decoding. The image or signal processor 550 may include a barcode module 552, a dynamic indicator module 554, and a reference region module 556. The barcode module 552 may be configured to perform image processing, analysis and/or decoding of the portion of the image related to the barcode 110, Similarly, the dynamic indicator module 554 may be configured to perform image processing, analysis and/or decoding of the portion of the image related to the dynamic indicator(s) 150 and the reference region module 556 may be configured to perform image processing, analysis and/or decoding of the portion of the image related to the reference regions 160.

Data from the image or signal processor 550 may be passed to a converter 560 before being sent to the processor 510. For example, the converter 560 may be an analog-to-digital converter. In another example, the signal (e.g., analog signal) may be amplified before being converted to a digital signal by converter 560.

The reader 500 may be used to obtain the product life data. For example, an image sensor 520 of a reader 500, such as a smartphone carrying a TTI App reader, may be used to scan the 2D barcode, the surrounding dynamic indicator(s) 150 and reference region(s) 160. For example, the image may be captured from an image sensor 520, such as the smartphone camera, using a light source 542 (e.g., camera flash, such as a smartphone white flash). The nominally white flash intensity may overwhelm the ambient light and set the color temperature for image capture by the sRGB sensor of the camera. The image sensor 520 may capture the white incident light reflectance of the pixels, including those of the surrounding dynamic indicator(s) 150 and/or the reference region(s) 160.

In an example, a filter 534 (e.g., a physical color filter) may be positioned over the camera lens when the sRGB image is captured. Alternatively, a filter 534, such as a digital filter may be applied over the sRGB image pixel map to create a colored light filter effect on the reflectance data. As an example the digital filter may programmed to process the sRGB image based on an appropriate center wavelength and range, as in a bandpass filter. Then, the filtered color image RGB values may be reduced to a greyscale value (e.g., range 0 to 255) and a greyscale pixel map for the Data Matrix barcode may be created. In an example, the 2D barcode may include encoded data to provide the appropriate inputs and may be used to program a barcode reader for reading color saturation and/or density of the dynamic indicator(s) 150. For example, through encoded data, data identifiers (DIs) and/or Application Identifiers (AIs), the barcode can automatically program the barcode reader to properly sense color reflectivity of the dynamic indicator(s) 150. The encoded data in the data identifiers (e.g., Application Identifiers) may also include the appropriate lifetime equation parameters such that the reader can estimate the used and/or remaining product life at a specified temperature for the scanned product.

After scanning the barcode and obtaining the appropriate life data, the reader 500 may display information about the marked product and the remaining life on display 580. For example, a medical product (e.g., inactivated Polio vaccine) may be scanned to reveal product lifetime data, such as a Monitor Category: VVM7, 80 percent life remaining, expiration date (e.g., calculated from the estimated remaining life or based on some other criteria), and product authenticity. Additionally, the barcode data may include AI (01) for a GTIN, AI (10) batch number, and AI (21) serial number that are displayed by the reader 500. After reflectance data is obtained from the image sensor 520, the appropriate equation parameters can be used to determine equivalent exposure time ($t_e$) at the reference temperature, and subtracting ($t_e$) from the lifetime may provide the remaining product life at the reference temperature.

After reflectance data is obtained from the image sensor, the appropriate equation parameters can be used to determine equivalent exposure time ($t_e$) at the reference temperature. Subtracting ($t_e$) from the lifetime gives the remaining product life at the reference temperature. If the remaining life is positive, then the percentage of really remaining life may be calculated by dividing $t_e$ by L, and the barcode reader may display "Tests Passed", along with the vaccine's available remaining life It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Also, it should be appreciated that the features of the dependent claims may be embodied in the systems, methods, and apparatus of each of the independent claims.

Many modifications to and other embodiments of the invention set forth herein will come to mind to one skilled in the art to which these inventions pertain, once having the benefit of the teachings in the foregoing descriptions and associated drawings. Therefore, it is understood that the inventions are not limited to the specific embodiments disclosed, and that modifications and other embodiments are intended to be included within the scope of the appended claims. Although specific terms are employed herein, they are used in a generic and descriptive sense only and not for purpose of limitation.

The invention is claimed as follows:

1. An indicator, comprising:
   a substrate;
   a two-dimensional barcode symbol provided on the substrate, in a rectangular configuration;
   a space on the substrate surrounding the barcode symbol having four quadrants; and
   an historical environmental condition indicator, at least a contiguous portion of the historical environmental indicator responsive to the same predetermined environmental condition occupying the space on the substrate in at least three of the four quadrants.

2. The indicator of claim 1, wherein the barcode symbol is a square with four side boundaries, and each quadrant corresponds to one side boundary of the two-dimensional barcode symbol.

3. The indicator of claim 1, wherein the portion of the historical environmental condition indicator responding to the same predetermined environmental condition is a hollow rectangle, surrounding the two-dimensional barcode symbol.

4. The indicator of claim 1, further comprising:
   a reference region surrounding the bar code in the same quadrants as the historical environmental condition indicator.

5. The indicator of claim 1, further comprising:
   a second historical environmental condition indicator located between the first environmental condition indicator and the two-dimensional barcode symbol.

6. The indicator of claim 1, wherein the historical environmental condition indicator has a chemistry that is configured, responsive to the occurrence of an environmental condition, to undergo a chemical or physical state change between an initial state and an end state, causing a change in the color state of the historical environmental condition indicator, wherein the color state indicates exposure to the environmental condition.

7. The indicator of claim 6, wherein the barcode symbol is valid when the historical environmental condition indicator is in the initial state.

8. The indicator of claim 6, wherein the environmental condition is selected from the group consisting of time, temperature, and time-temperature product.

9. The indicator of claim 6, wherein the historical environmental condition indicator continuously changes color state between the initial state and the end state when exposed to the environmental condition.

10. The indicator of claim 6, wherein the historical environmental condition indicator is initially in a first color state when unactivated and dynamically changes to a plurality of different color states within a range between the initial state and the end state before reaching the end state.

11. The indicator of claim 6, wherein the historical environmental condition indicator reaches an intermediate state between the initial state and the end state when the specified condition of the sensed property is beyond a threshold value.

12. The indicator of claim 1, wherein the two-dimensional barcode symbol is from the symbology group consisting of Data Matrix, QR Code, Aztec Code, MaxiCode, PDF417 and Dot Code symbologies.

13. The indicator of claim 1, wherein the historical environmental condition indicator dynamically changes to a plurality of different color states related to one of expended product life and remaining labeled product life.

14. The indicator of claim 1, wherein the barcode symbol includes encoded data identifiers, and wherein a first data identifier indicates a size and location of the historical environmental condition indicator and a second data identifier indicates product life equation parameters.

15. The indicator of claim 1, wherein the historical environmental condition indicator is a historical temperature indicator.

16. The indicator of claim 1, wherein the historical environmental condition indicator occupies the space on the substrate in at least three of the four quadrants.

17. The indicator of claim 1, wherein the historical environmental condition indicator occupies the space on the substrate in all four quadrants.

18. An indicator comprising:
   a substrate;
   a two-dimensional barcode symbol provided, on the substrate, in a rectangular configuration;
   a space on the substrate surrounding the barcode symbol and spaced from the barcode symbol by a gap, the gap having a width; and
   an historical environmental condition indicator on the substrate, the historical temperature indicator responsive to a predetermined environmental condition and occupying at least a portion of the rectangular bar code configuration; and
   a reference region surrounding the bar code outside the gap.

19. The indicator of claim 18, wherein the historical environmental condition indicator is located in an invariant area of the two-dimensional barcode symbol.

20. The indicator of claim 18, wherein the historical environmental condition indicator is a historical temperature indicator.

21. A method of reading an indicator, the method comprising:
   optically scanning an image of the indicator to obtain color values for pixels in the image, wherein the indicator includes a two-dimensional barcode symbol provided on a substrate and at least one dynamic indicator, wherein the at least one dynamic indicator is provided in a space on the substrate surrounding the barcode symbol;
   constructing a scanned pixel map containing the color values in the two-dimensional barcode symbol and the at least one dynamic indicator;
   processing the pixels in the scanned pixel map to assign a binary color value to each pixel and to form a binarised pixel map;
   identifying the two-dimensional barcode symbol in the binarised pixel map;
   decoding the identified two-dimensional barcode symbol in the binarised pixel map to recover a symbol codeword sequence;
   recovering underlying data codewords from the symbol codeword sequence-by utilizing an error correction process on the symbol codeword sequence;
   processing the data codewords for identification of the at least one dynamic indicator;
   determining an average color value of the at least one dynamic indicator; and
   processing the average color value of the at least one dynamic indicator to determine a reflectance percentage of incident light at a time of scanning.

22. The method of claim 21, wherein processing the average color values includes:
   capturing white light reflectance of pixels included in the at least one dynamic indicator; and creating a colored light filter effect on reflectance data from the scanned pixels utilizing a filter to generate filtered colored image values of the pixels in a scanned pixel map.

23. The method of claim 22, further comprising:
reducing the filtered colored image values in the scanned pixel map to greyscale values;
determining an average greyscale value of the average color value of the barcode modules; and
processing the average grey value to determine the incident light reflectance percentage at the time of scanning.

24. The method of claim 21, wherein processing the pixels in the scanned pixel map includes classifying each pixel as one of a black pixel, a white pixel, and a color pixel.

25. The method of claim 24, wherein the black pixels, the white pixels, and the color pixels are used to form a ternarised pixel map, and the black and white pixels in the ternarised pixel map are used to identify the two-dimensional barcode symbol in the ternarised pixel map.

26. The method of claim 21, wherein the at least one dynamic indicator includes a plurality of dynamic indicators, and wherein determining the average color value of the at least one dynamic indicator includes determining an average color value of a subset of the plurality of dynamic indicators.

27. The method of claim 26, wherein the subset is selected based on at least one of (i) orientation of the barcode symbol in relation to a reader, (ii) position of a respective dynamic indicator of the plurality of dynamic indicators in relation to the barcode symbol and the reader, and (iii) distance between a respective dynamic indicator of the plurality of dynamic indicators and the reader.

28. A reading apparatus comprising:
a light source configured to illuminate an indicator including a two-dimensional barcode symbol and at least one dynamic indicator;
an image sensor configured to capture image data from light reflected from the indicator; and
a processor including a barcode module and a dynamic indicator module, wherein
the barcode module is configured to decode representations of the two-dimensional barcode in the image data captured by the image sensor, and
the dynamic indicator module is configured to process pixels of the image data corresponding to the at least one dynamic indicator, assign a binary color value to each pixel, determine an average color value of the at least one dynamic indicator, and process the average color value of the at least one dynamic indicator to determine a reflectance percentage of incident light at a time of scanning.

29. The reading apparatus of claim 28, wherein the at least one dynamic indicator includes a plurality of dynamic indicators, and wherein the dynamic indicator module is configured to determine an average color value of a subset of the plurality of dynamic indicators.

30. The reading apparatus of claim 29, wherein the subset is selected based on at least one of (i) orientation of the barcode symbol in relation to the reading apparatus, (ii) position of a respective dynamic indicator of the plurality of dynamic indicators in relation to the barcode symbol and the reading apparatus, and (iii) distance between a respective dynamic indicator of the plurality of dynamic indicators and the reader.

* * * * *